(12) United States Patent
Tashiro et al.

(10) Patent No.: US 8,236,127 B2
(45) Date of Patent: Aug. 7, 2012

(54) METHOD AND APPARATUS FOR MANUFACTURING CONTINUOUS FIBER-REINFORCED THERMOPLASTIC RESIN PELLET

(75) Inventors: Naoyuki Tashiro, Takasago (JP); Takayasu Fujiura, Kobe (JP); Kaduya Takamura, Kobe (JP); Seiji Zenke, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 206 days.

(21) Appl. No.: 12/678,762

(22) PCT Filed: Sep. 19, 2008

(86) PCT No.: PCT/JP2008/066970
§ 371 (c)(1),
(2), (4) Date: Mar. 18, 2010

(87) PCT Pub. No.: WO2009/044641
PCT Pub. Date: Apr. 9, 2009

(65) Prior Publication Data
US 2010/0230040 A1    Sep. 16, 2010

(30) Foreign Application Priority Data

Oct. 2, 2007 (JP) .................. 2007-258945
Oct. 26, 2007 (JP) .................. 2007-279195
Feb. 25, 2008 (JP) .................. 2008-043221

(51) Int. Cl.
*B29C 65/00* (2006.01)
*B32B 37/00* (2006.01)
*B32B 39/10* (2006.01)
*B65H 21/00* (2006.01)

(52) U.S. Cl. ........ 156/254; 156/166; 156/441; 156/148; 156/502; 156/270; 156/327; 156/257; 156/268; 156/304.5; 156/304.1; 242/553; 242/556

(58) Field of Classification Search .................. 156/166, 156/441, 148, 502, 517, 254, 270, 327, 257, 156/268, 304.1, 304.5; 242/553, 556
See application file for complete search history.

(56) References Cited

U.S. PATENT DOCUMENTS 5,534,210 A    7/1996    Shirai et al.
(Continued)

FOREIGN PATENT DOCUMENTS
EP    000628392    * 12/1994
(Continued)

OTHER PUBLICATIONS

Office Action issued Mar. 6, 2012, in Japanese Application No. 2008-043221, filed Feb. 25, 2008 with an English Translation.

(Continued)

*Primary Examiner* — Linda L Gray
(74) *Attorney, Agent, or Firm* — Oblon, Spivak, McClelland, Maier & Neustadt, L.L.P.

(57) ABSTRACT

A method and apparatus for manufacturing a continuous fiber-reinforced thermoplastic resin pellet are provided which can smoothly carry out a continuous drawing-out operation for a reinforcing fiber bundle (continuous fiber-reinforced resin strand).

With respect to a terminal end of a reinforcing fiber bundle A of a roving package being exhausted and a front end of a reinforcing fiber bundle B of a new roving package, fiber quantity-halved end portions A1 and B1 each about half of the original fiber quantity are formed respectively, then reinforcing filaments in those fiber quantity-halved end portions are entangled by an air splicer to form an entangled portion C1, and reinforcing filaments in a portion downstream of the fiber quantity-halved end portion in the reinforcing fiber bundle B of the new roving package are entangled by an air splicer to form an entangled portion C2.

5 Claims, 19 Drawing Sheets

U.S. PATENT DOCUMENTS

2003/0201057 A1 * 10/2003 Dolan et al. .................. 156/98
2003/0235688 A1    12/2003 Mizukami et al.

FOREIGN PATENT DOCUMENTS

| | | |
|---|---|---|
| JP | 54 112452 | 9/1979 |
| JP | 60 15370 | 1/1985 |
| JP | 62 140973 | 6/1987 |
| JP | 62 173348 | 11/1987 |
| JP | 4 286574 | 10/1992 |
| JP | 5 169445 | 7/1993 |
| JP | 6 79348 | 3/1994 |
| JP | 6 114832 | 4/1994 |
| JP | 6 63547 | 9/1994 |
| JP | 06285855 | * 10/1994 |
| JP | 7 205317 | 8/1995 |
| JP | 7 228422 | 8/1995 |
| JP | 9 47814 | 2/1997 |
| JP | 2001 88881 | 4/2001 |
| JP | 2003 301340 | 10/2003 |
| JP | 2004 25482 | 1/2004 |

OTHER PUBLICATIONS

Office Action issued Mar. 6, 2012, in Japanese Application No. 2007-279195, filed with an English Translation.

* cited by examiner

METHOD AND APPARATUS FOR MANUFACTURING CONTINUOUS FIBER-REINFORCED THERMOPLASTIC RESIN PELLET

TECHNICAL FIELD

The present invention relates to a method and apparatus for manufacturing a continuous fiber-reinforced thermoplastic resin pellet with use of a reinforcing fiber bundle which is drawn out continuously from a roving package.

BACKGROUND ART

A continuous fiber-reinforced thermoplastic resin pellet (hereinafter referred to also simply as "continuous fiber-reinforced resin pellet") is used as a raw material in injection molding.

In manufacturing a continuous fiber-reinforced resin pellet there is used a roving package comprising windings of a reinforcing fiber bundle (roving) of a large number of reinforcing filaments. More particularly, a reinforcing fiber bundle drawn out from a roving package is introduced continuously into an impregnation die and is impregnated with molten thermoplastic resin, further, a continuous fiber-reinforced resin strand withdrawn continuously from the impregnation die is cut into a predetermined length, whereby a continuous fiber-reinforced resin pellet is manufactured.

Thus, for manufacturing a continuous fiber-reinforced resin pellet it is necessary to draw out a reinforcing fiber bundle (continuous fiber-reinforced resin strand) continuously, so if there occurs a trouble in the drawing-out operation, it is no longer possible to manufacture a continuous fiber-reinforced resin pellet in an efficient manner.

DISCLOSURE OF THE INVENTION

The present invention has been accomplished for solving the above-mentioned problem and it is an object of the invention to provide a method and apparatus for manufacturing a continuous fiber-reinforced thermoplastic resin pellet which method and apparatus permit smooth execution of an operation of continuously drawing out a reinforcing fiber bundle (continuous fiber-reinforced resin strand).

For achieving the above-mentioned object, a first invention provides a method for manufacturing a continuous fiber-reinforced thermoplastic resin pellet, comprising the steps of drawing out a reinforcing fiber bundle of a large number of reinforcing filaments continuously from a roving package, introducing the reinforcing fiber bundle thus drawn out from the roving package into an impregnation die continuously, impregnating the thus-introduced reinforcing fiber bundle with molten thermoplastic resin to produce a resin-impregnated reinforcing fiber bundle, twisting the resin-impregnated reinforcing fiber bundle that is passing continuously through the impregnation die by a twisting device disposed on a downstream side of the impregnation the to produce a continuous fiber-reinforced resin strand, and cutting the continuous fiber-reinforced resin strand to produce a pellet while withdrawing the continuous fiber-reinforced resin strand continuously, wherein the step of drawing out the reinforcing fiber bundle continuously from the roving package includes an operation of splicing the reinforcing fiber bundle fed from a roving package being exhausted and the reinforcing fiber bundle fed from a new roving package with each other, the reinforcing fiber bundle splicing operation being carried out in such a manner that, with respect to each of a terminal end portion of the reinforcing fiber bundle from the roving package being exhausted and a start end portion of the reinforcing fiber bundle from the new roving package, a part in a sectional direction orthogonal to the longitudinal direction of the reinforcing fiber bundle concerned is removed over a predetermined range in the longitudinal direction of the reinforcing fiber bundle to form a fiber quantity-halved end portion where the quantity of fibers in the section of the reinforcing fiber bundle is about half of the original fiber quantity, further, the reinforcing filaments in the fiber quantity-halved end portion of the roving package being exhausted and the reinforcing filaments in the fiber quantity-halved end portion of the new roving package are entangled with each other at one or more positions in their longitudinal direction by means of an air splicer, and in a fiber quantity unreduced end portion which is an upstream portion relative to the fiber quantity-halved end portion in the reinforcing fiber bundle of the new roving package and in which the part in the sectional direction remains unremoved, the reinforcing filaments are entangled with each other at one or more positions in their longitudinal direction by means of an air splicer.

A second invention provides an apparatus for manufacturing a continuous fiber-reinforced thermoplastic resin pellet, comprising a roving package constituted by a cylindrical package of a reinforcing fiber bundle, a reinforcing fiber bundle delivery device for drawing out the reinforcing fiber bundle in a successive manner from an inner periphery side of the roving package, an impregnation die for impregnating the reinforcing fiber bundle with molten thermoplastic resin to produce a resin-impregnated reinforcing fiber bundle, the reinforcing fiber bundle being introduced into the impregnation die after being drawn out continuously from the roving package by the reinforcing fiber bundle delivery device, a withdrawing device disposed on a downstream side of the impregnation die to withdraw a continuous fiber-reinforced resin strand of the resin-impregnated reinforcing fiber bundle continuously from the impregnation die, and a cutter member for cutting the continuous fiber-reinforced resin strand, wherein the reinforcing fiber bundle delivery device includes a plurality of collapse suppressing members adapted to be pushed radially outwards against an inner periphery surface of the roving package to suppress collapse of winding layers and pushing means for displacing the plural collapse suppressing members radially outwards following the inner periphery surface of the roving package which inner periphery surface shifts radially outwards gradually as the reinforcing fiber bundle is drawn out in a successive manner.

A third invention provides an apparatus for manufacturing a continuous fiber-reinforced thermoplastic resin pellet, comprising a plurality of roving packages each constituted by a cylindrical package of a reinforcing fiber bundle, a reinforcing fiber bundle delivery device configured to deliver the reinforcing fiber bundle in a successive manner from each of the roving packages without causing rotation of each of the roving packages, a terminal end of the reinforcing fiber bundle in one roving package and a front end of the reinforcing fiber bundle in another roving package which reinforcing fiber bundle is to be next taken out being connected with each other in series, an impregnation die for impregnating the reinforcing fiber bundle with molten thermoplastic resin to produce a resin-impregnated reinforcing fiber bundle, the reinforcing fiber bundle being introduced into the impregnation die after being drawn out continuously from the roving packages by the reinforcing fiber bundle delivery device, a withdrawing device disposed on a downstream side of the impregnation die to withdraw a continuous fiber-reinforced resin strand of the resin-impregnated reinforcing fiber bundle continuously from the impregnation die, and a cutter member for cutting the continuous fiber-reinforced resin strand, wherein the reinforcing fiber bundle delivery device includes a core guide for holding each of the roving packages in a stand-up attitude with the axis of each roving packages facing in a vertical direction and a reinforcing fiber bundle take-out guide disposed above the roving packages and adapted to support an intermediate portion of the reinforcing fiber bundle being conducted from the roving package to the impregnation die, and wherein if in a plan view a point of intersection between an extension line of a straight line, the straight line connecting the reinforcing fiber bundle take-out guide and an axial point of the roving package, and an outer circumference of the roving package is assumed to be a remotest point, then in a front view as seen in a direction orthogonal to a vertical plane including the axial point and the remotest point, each of the roving packages and the reinforcing fiber bundle take-out guide are disposed in such a manner that a take-out angle between a reinforcing fiber bundle pass line extending from the remotest point to the reinforcing fiber take-out guide and an axis of the roving package concerned is always not larger than 45° irrespective of the diameter of the outer circumference of the roving package.

According to the present invention it is possible to smoothly carry out an operation of continuously drawing out a reinforcing fiber bundle (continuous fiber-reinforced resin strand).

BEST MODE FOR CARRYING OUT THE INVENTION

Embodiments of the present invention will be described below while making reference to the accompanying drawings. The following embodiments are embodied examples of the present invention, not limiting the technical scope of the invention.

First Embodiment

Figure 1:
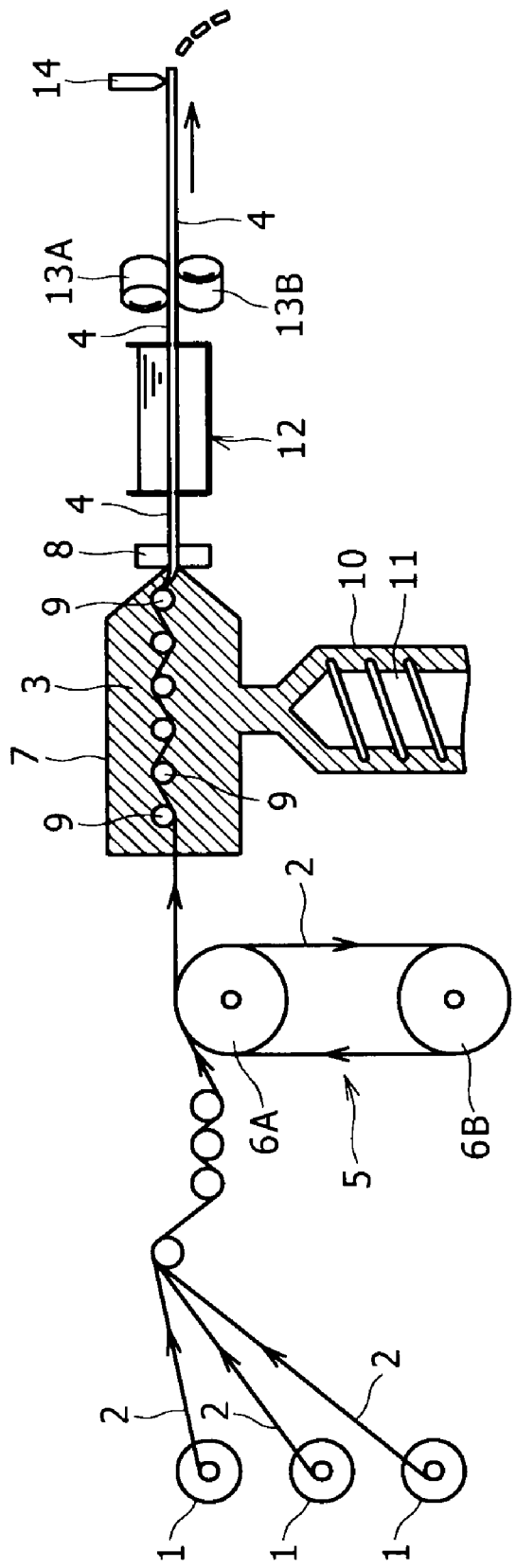
FIG. 1 is a diagram showing the configuration of a continuous fiber-reinforced thermoplastic resin pellet manufacturing apparatus for carrying out a manufacturing method related to the first invention.

FIG. 1 is a diagram showing the configuration of a continuous fiber-reinforced thermoplastic resin pellet manufacturing apparatus for carrying out a manufacturing method related to the first invention.

As shown in FIG. 1, plural (three in the example of FIG. 1) reinforcing fiber bundles 2 drawn out from roving packages 1 are arranged and then conducted to a pre-heat heating device 5 provided with a pair of heating rollers 6A and 6B. In a heated state by the pre-heat heating device 5 the reinforcing fiber bundles 2 are conducted into an impregnation die 7. Molten resin (molten thermoplastic resin) 3 is supplied into the impregnation die 7 continuously from an extruding machine 10 which has a built-in screw 11. In the interior of the impregnation die 7 are disposed plural impregnation rollers 9 for impregnating the reinforcing fiber bundles 2 with the molten resin 3. A die nozzle 8 is attached to an exit of the impregnation die 7. The die nozzle 8 defines the diameter of a continuous fiber-reinforced resin strand 4 of a circular section formed by twisted, resin-impregnated reinforcing fiber bundles.

The molten resin is impregnated into the reinforcing fiber bundles 2 passing through the impregnation die 7, affording resin-impregnated reinforcing fiber bundles. Twisting rollers 13A and 13B as a twisting device disposed on a downstream side of the impregnation die 7 are adapted to twist the resin-impregnated reinforcing fiber bundles. The continuous fiber-reinforced resin strand 4 formed by the twisted, resin-impregnated reinforcing fiber bundles is withdrawn continuously from the impregnation die 7 by the twisting rollers 13A and 13B.

The continuous fiber-reinforced resin strand 4 of a high temperature drawn out from the nozzle 8 in the impregnation die 7 is cooled and hardened in a cooling water bath 12 and is conducted to the twisting rollers 13A and 13B. The continuous fiber-reinforced resin strand 4 conducted to a downstream side of the twisting rollers 13A and 13B is cut into a predetermined length by a pelletizer 14, affording a continuous fiber-reinforced resin pellet.

Figure 2:
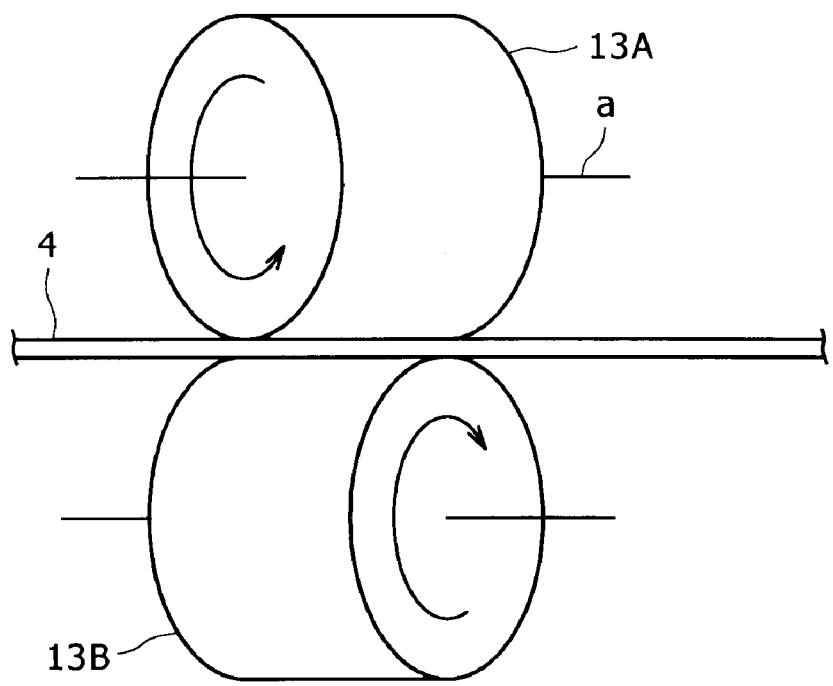
FIG. 2 is a side view for explaining twisting rollers shown in FIG. 1.
Figure 3:
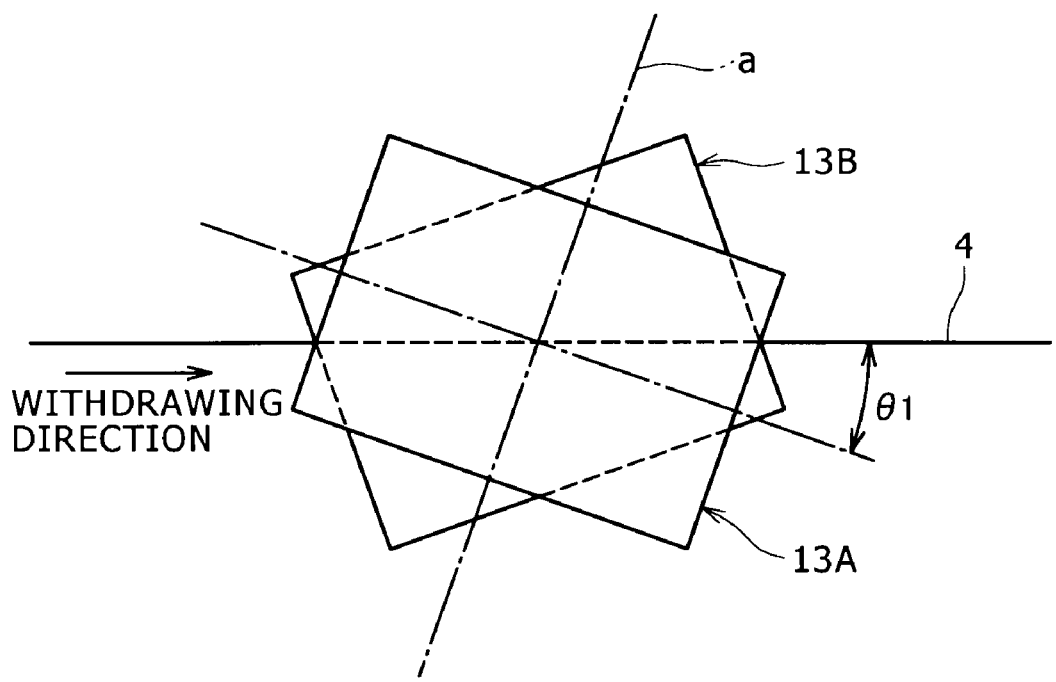
FIG. 3 is a plan view for explaining a twisting angle of the twisting rollers shown in FIG. 2.

FIG. 2 is a side view for explaining the twisting rollers shown in FIG. 1. FIG. 3 is a plan view for explaining a twisting angle of the twisting rollers shown in FIG. 2.

As shown in FIG. 2, rotational axes of the pair of twisting rollers 13A and 13B are positioned on parallel planes (horizontal planes) respectively so as to cross each other in a plan view as seen in a direction orthogonal to the planes. In this state the twisting rollers 13A and 13B are disposed in opposition to each other so as to sandwich therebetween the continuous fiber-reinforced resin strand 4 fed from the upstream side. That is, in a plan view, the rotational axis of the twisting roller 13A as an upper roller in FIG. 2 and that of the twisting roller 13B as a lower roller in the same figure are shifted in directions opposite to each other with respect to the withdrawing direction of the continuous fiber-reinforced resin stand 4 and by the same predetermined angle (a twisting angle θ1, see FIG. 3).

As shown in FIG. 3, the twisting angle θ1 of the twisting roller 13A is an angle between a line orthogonal to the rotational axis, a, of the twisting roller 13A and the withdrawing direction of the continuous fiber-reinforced resin strand 4 in plan view. The twisting angle of the lower twisting roller 13B is the same as the twisting angle θ1 of the upper twisting roller 13A.

As methods for drawing out (delivering) the reinforcing fiber bundle from each roving package there are an outside withdrawing method and an inside withdrawing method. In the outside withdrawing method, the reinforcing fiber bundle is drawn out from the outer periphery side of the roving package under rotation of the roving package. On the other hand, in the inside withdrawing method, the reinforcing fiber bundle is drawn out from the inner periphery side of the roving package in a state in which the roving package is placed on a certain thing. There is also a method wherein the reinforcing fiber bundle is drawn out from the outer periphery side of the roving package in a state in which the roving package is placed on a certain thing. In the manufacturing apparatus shown in FIG. 1, each roving package 1 is formed by winding the reinforcing fiber bundle in the shape of a coreless cylinder, and there is adopted the inside withdrawing method wherein the reinforcing fiber bundle 2 is drawn out from the inner periphery side of the roving package 1.

Figure 4:
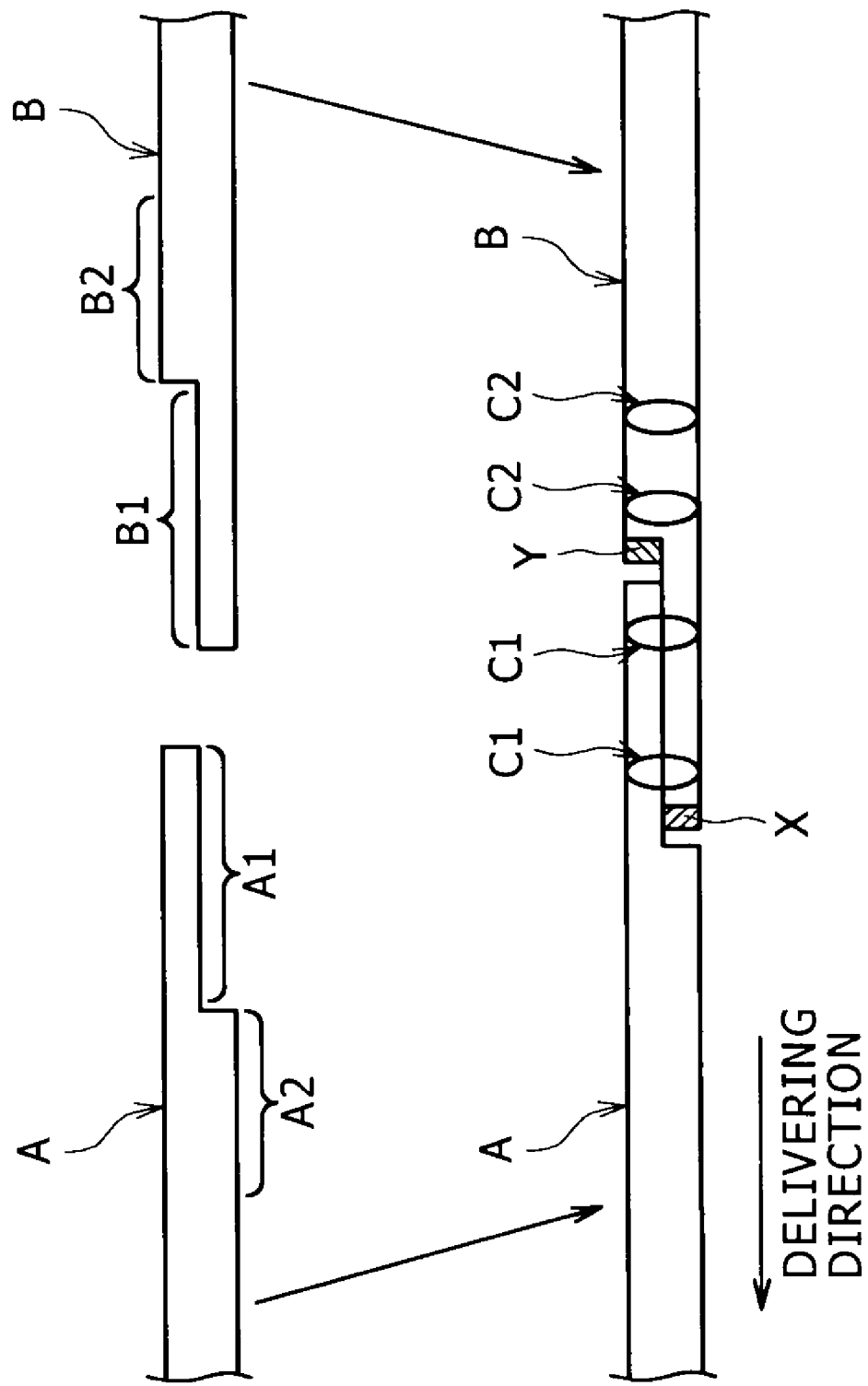
FIG. 4 is a schematic diagram for explaining a method for splicing reinforcing fiber bundles with each other in connection with the manufacturing method related to the first invention.

FIG. 4 is a schematic diagram for explaining a method for splicing reinforcing fiber bundles with each other in connection with the manufacturing method related to the first invention.

The manufacturing method related to this embodiment is for splicing a reinforcing fiber bundle A of a roving package being exhausted and a reinforcing fiber bundle B of a new roving package with each other. More specifically, over a predetermined range in the longitudinal direction of a terminal end portion of the reinforcing fiber bundle A located on the side being exhausted, a portion in the thickness direction orthogonal to the longitudinal direction is cut off with scissors or the like to form a fiber quantity-halved end portion A1 having a fiber quantity about half of the original quantity.

Likewise, over a predetermined range in the longitudinal direction of a start end portion of the new-side reinforcing fiber bundle B, a portion in the thickness direction orthogonal to the longitudinal direction is cut off with scissors or the like to form a fiber quantity-halved end portion B1 having a fiber quantity half of the original quantity. The length of each of the fiber quantity-halved end portions A1 and B1 is in the range of about 50 to 150 mm. In the case of reinforcing fibers of the type easy to get entangled, the length of each of the fiber quantity-halved end portions A1 and B1 is about 50 mm, while in the case of reinforcing fibers of the type difficult to get entangled, the length in question is about 100 to 150 mm.

Next, both fiber quantity-halved end portions A1 and B1 are joined so as to be superimposed one on the other and are entangled at one or more positions in their longitudinal direction by an air splicer to form an entangled portion C1. In the example of FIG. 4, entangled portions C1 are formed at two positions. Therefore, the fiber quantity in each entangled portion C1 is approximately the same as the fiber quantity (the original fiber quantity) of each of the reinforcing fiber bundles A and B and hence the thickness of the spliced portion formed by both fiber quantity-halved end portions A1 and B1 can be made approximately the same as the thickness of each of the reinforcing fiber bundles A and B.

Further, in a fiber quantity unreduced end portion B2 which portion (a portion located upstream of the fiber quantity-halved end portion B1) is continuous with the new-side fiber quantity-halved end portion B1 and which is equal in thickness to the original reinforcing fiber bundle portion not reduced in the quantity of fibers, reinforcing filaments are entangled at one or more positions in the longitudinal direction by means of an air splicer to form an entangled portion C2. In the example of FIG. 4, entangled portions C2 are formed at two positions. By forming the entangled portions C2 it is possible to prevent the reinforcing fibers in the fiber quantity unreduced end portion B2 from being disjoined with consequent breaking of the spliced portion while the reinforcing fiber bundle is being conducted into the impregnation die. Besides, the thickness of each entangled portion C2 is approximately equal to the thickness of each of the reinforcing fiber bundles A and B. The fiber quantity unreduced end portion A2 continuous with the fiber quantity-halved end portion A1 located on the side being exhausted is withdrawn from the impregnation die while being twisted and therefore does not clog the die nozzle even if it is pulled from the downstream side. Thus, it is not necessary to form an entangled portion in the fiber quantity unreduced end portion A2. After forming the entangled portions by the air splicer, reinforcing fiber portions (indicated at X and Y in FIG. 4) of the new-side reinforcing fiber bundle B, which portions are positioned on the front end side with respect to the entangled portions C1 and are apt to be disjoined, are cut off with scissors or the like lest they should be caught in the die nozzle. Instead of cutting off, the reinforcing fiber portions X and Y apt to be disjoined may be fixed using an adhesive of the same kind of resin as the thermoplastic resin which is impregnated into the reinforcing fiber bundles A and B.

Thus, by forming the entangled portions C1 and C2 with the air splicer, the reinforcing fiber bundle A on the side being exhausted and the reinforcing fiber bundle B on the new side can be spliced with each other in such a manner that the thickness of the spliced portion becomes almost equal to the thickness of each of the reinforcing fiber bundles A and B. Consequently, it is possible to suppress the occurrence of a trouble that the spliced portion is caught in the die nozzle and clogging the same nozzle. Accordingly, the spliced portion can be allowed to pass through the die nozzle while suppressing the occurrence of breaking of each reinforcing fiber bundle. As a result, it is possible to improve the manufacturing speed.

In the above method, the entangled portions C2 are formed in the fiber quantity unreduced end portion B2 of the new-side reinforcing fiber bundle B. Therefore, it is possible to suppress the occurrence of disjoining in the fiber quantity unreduced end portion B2 and breaking of the spliced portion while the spliced portion is being conducted to the impregnation die through a pass line having bends. Thus, the spliced portion can be allowed to pass through the die nozzle without giving rise to the situation that the new-side reinforcing fiber bundle B does not reach the impregnation die. As a result, it is possible to improve the manufacturing speed.

Moreover, by adopting the pultruding method involving twisting as described above, the resin-impregnated reinforcing fiber bundle is drawn out from the die nozzle while being twisted. Therefore, fluffs which occur when the spliced portion passes through the die nozzle can be drawn out from the die nozzle. Thus, after passing of the spliced portion through the die nozzle, it is possible to avoid the occurrence of a state that the production is compelled to be stopped due to clogging of the die nozzle with fluffs.

In splicing reinforcing fiber bundles by the method described above, an adhesive of the same resin as the thermoplastic resin to be impregnated into the reinforcing fiber bundles A and B may be applied to the entangled portions C1 and C2. By doing so, the reinforcing fiber bundles A and B can be spliced together in a more positive manner and hence the spliced portion can be allowed to pass through the die nozzle while suppressing the occurrence of breaking of the reinforcing fiber bundles. As a result, the manufacturing speed can be further improved.

Next, a description will now be given about examples related to the above first embodiment. Using reinforcing fiber bundles each formed with a spliced portion, there was conducted an experiment for manufacturing continuous fiber-reinforced resin pellets by the manufacturing apparatus shown in FIG. 1. A method for splicing reinforcing fiber bundles was evaluated in this experiment. Glass fiber bundles were used as the reinforcing fiber bundles. The configuration of each glass fiber bundle is as follows: glass fiber dia. (filament dia.) 17 µm, weight 2400 g/km.

Example 1

The following conditions were adopted as experimental conditions. Glass fiber bundles: 3 bundles, manufacturing speed (withdrawing speed): 80 m/min, thermoplastic resin: polypropylene, fiber content: about 70%, twisting angle $\theta_1$ (see FIG. 3) of each twisting roller: 17.5°. The length of each of the fiber quantity-halved end portions A1 and B1 was set at about 150 mm. Four entangled portions were formed in the fiber quantity-halved end portions A1 and B1. As to the new-side fiber quantity unreduced end portion B2 there was formed one entangled portion. This experiment using the three glass fiber bundles was conducted ten times. In each run, splicing was performed for one of the three glass fiber bundles by the method described above.

As a result, in each of all the ten runs, the spliced portion passed through the die nozzle. Fluffs which occurred during passage of the spliced portion through the nozzle were drawn out while being twisted from the nozzle. Thus, even after passage of the spliced portion through the die nozzle, the manufacture of continuous fiber-reinforced resin pellets could be performed continuously in a satisfactory manner.

Example 2

The following conditions were adopted as experimental conditions. Glass fiber bundles: 3 bundles, manufacturing speed (withdrawing speed): 80 m/min, thermoplastic resin: polypropylene, fiber content: about 70%, twisting angle $\theta_1$ of each twisting roller: 17.5°. The length of each of the fiber quantity-halved end portions A1 and B1 was set at about 150 mm. Four entangled portions were formed in the fiber quantity-halved end portions A1 and B1. As to the new-side fiber quantity unreduced end portion B2 there was formed one entangled portion. Further, liquid polypropylene resin as an adhesive was applied as a thin film to each of the four entangled portions and was cured. This experiment using the three glass fiber bundles was repeated ten times. In each run, splicing was performed for one of the three glass fiber bundles by the method described above.

As a result, as is the case with Example 1, the spliced portion passed through the die nozzle in each of all the ten runs. Even after passage of the spliced portion through the die nozzle, the manufacture of continuous fiber-reinforced resin pellets could be performed continuously in a satisfactory manner.

Comparative Example 1

The following conditions were adopted as experimental conditions. Glass fiber bundles: 3 bundles, manufacturing speed: 5 m/min, thermoplastic resin: polypropylene, fiber content: about 70%, twisting angle $\theta_1$ of each twisting roller: 17.5°. End portions of glass fiber bundles to be spliced together were entangled by an air splicer while keeping each thickness intact. This experiment using the three glass fiber bundles was conducted four times. In each run, splicing was performed for one of the three glass fiber bundles by the method described above.

As a result, the spliced portion passed through the nozzle in each of two runs out of the four runs. Breaking occurred in the remaining two runs. Even when the spliced portion passed through the die nozzle, the die nozzle was clogged with a large amount of fluffs, with the result in that also in the two former runs it was impossible to continue the manufacture after passage of the spliced portion through the die nozzle.

Comparative Example 2

The following conditions were adopted as experimental conditions. Glass fiber bundles: 3 bundles, manufacturing speed: 80 m/min, thermoplastic resin: polypropylene, fiber content: about 70%, twisting angle $\theta_1$ of each twisting roller: 17.5°. The length of each of the fiber quantity-halved end portions A1 and B1 was set at about 150 mm. Four entangled portions were formed in the fiber quantity-halved end portions A1 and B1. No entangled portion was formed in the new-side fiber quantity unreduced end portion B2. This experiment using the three glass fiber bundles was performed three times. In each run, splicing was performed for one of the three glass fiber bundles by the method described above.

As a result, in each of the three runs, there occurred disjoining in the new-side fiber quantity unreduced end portion B2 with breaking of the spliced portion while the spliced portion was being conducted to the impregnation die through the pass line.

Comparative Example 3

The following conditions were adopted as experimental conditions. Glass fiber bundle: 1 bundle, manufacturing speed: 10 m/min, thermoplastic resin: polypropylene, fiber content: about 30%, twisting angle θ1 of each twisting roller: 0° (twist-free). The length of each of the fiber quantity-halved end portions A1 and B1 was set at about 150 mm. Four entangled portions were formed in the fiber quantity-halved end portions A1 and B1. One entangled portion was formed in the new-side fiber quantity unreduced end portion B2. This experiment using the one glass fiber bundle was conducted three times. In each run, splicing was performed for the glass fiber bundle by the method described above.

As a result, in each of the three runs, the spliced portion passed through the die nozzle. However, the die nozzle was clogged with a large amount of fluffs, and in each of the three runs it was impossible to continue the manufacture after passage of the spliced portion through the die nozzle.

Comparative Example 4

The following conditions were adopted as experimental conditions. Glass fiber bundle: 1 bundle, manufacturing speed: 10 m/min, thermoplastic resin: polypropylene, fiber content: about 30%, twisting angle θ1 of each twisting roller: 0° (twist-free). The length of each of the fiber quantity-halved end portions A1 and B1 was set at about 150 mm. Four entangled portions were formed in the fiber quantity-halved end portions A1 and B1. No entangled portion was formed in the new-side fiber quantity unreduced end portion B2. This experiment using the one glass fiber bundle was conducted three times. In each run, splicing was performed for the glass fiber bundle by the method described above.

As a result, in each of the three runs, there occurred disjoining in the new-side fiber quantity unreduced end portion B2 with breaking of the spliced portion while the spliced portion was being conducted to the impregnation die through the pass line.

Comparative Example 5

The following conditions were adopted as experimental conditions. Glass fiber bundles: 2 bundles, manufacturing speed: 5 m/min, thermoplastic resin: polypropylene, fiber content: about 50%, twisting angle θ1 of each twisting roller: 0° (twist-free). The length of each of the fiber quantity-halved end portions A1 and B1 was set at about 150 mm. Four entangled portions were formed in the fiber quantity-halved end portions A1 and B1. One entangled portion was formed in the new-side fiber quantity unreduced end portion B2. In each run, splicing was performed for one of the two glass fiber bundles by the method described above. This experiment using the two glass fiber bundles was conducted three times.

As a result, in each of the three runs, the spliced portion passed through the die nozzle. However, the die nozzle was clogged with a large amount of fluffs, and in each of the three runs it was impossible to continue manufacture after passage of the spliced portion through the die nozzle.

Comparative Example 6

The following conditions were adopted as experimental conditions. Glass fiber bundles: 3 bundles, manufacturing speed: 5 m/min, thermoplastic resin: polypropylene, fiber content: about 70%, twisting angle θ1 of each twisting roller: 0° (twist-free). The length of each of the fiber quantity-halved end portions A1 and B1 was set at about 150 mm. Four entangled portions were formed in the fiber quantity-halved end portions A1 and B1. One entangled portion was formed in the new-side fiber quantity unreduced end portion B2. This experiment using the three glass fiber bundles was conducted three times. In each run, splicing was performed for one of the three glass fiber bundles.

As a result, in each of the three runs, the spliced portion passed through the die nozzle. However, the die nozzle was clogged with a large amount of fluffs, and in each of the three runs it was impossible to continue the manufacture after passage of the spliced portion through the die nozzle.

Second Embodiment

Figure 5:
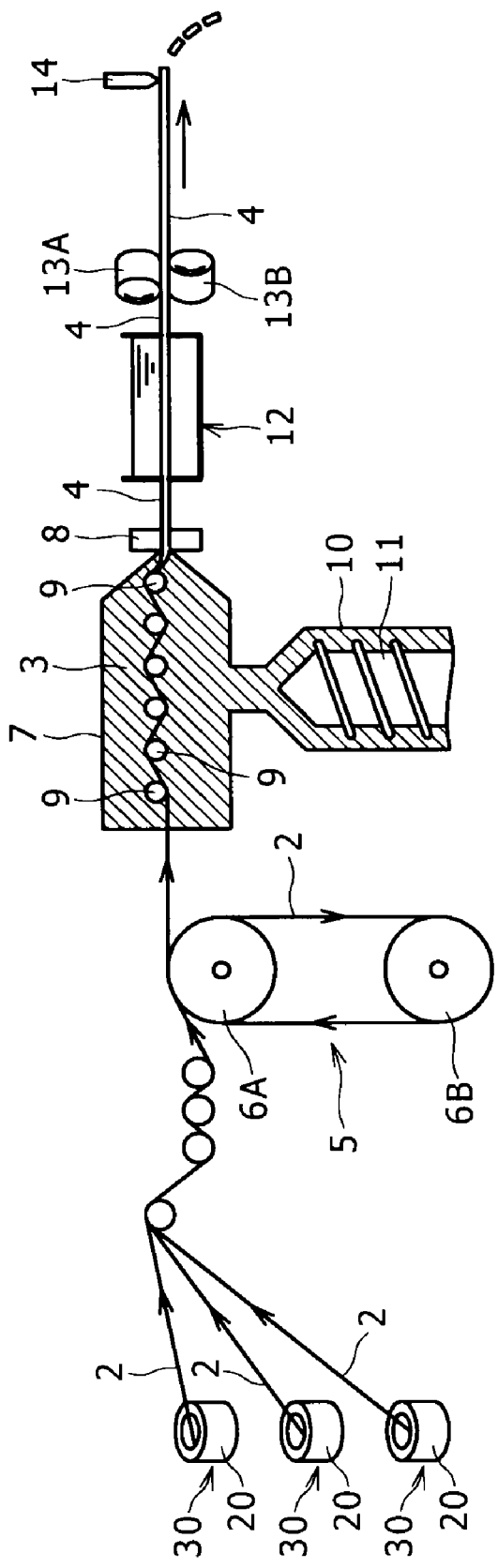
FIG. 5 is a diagram showing an entire configuration of a continuous fiber-reinforced thermoplastic resin pellet manufacturing apparatus according to an embodiment (second embodiment) related to the second invention.

A second embodiment related to the second invention will now be described while making reference to the accompanying drawings. FIG. 5 is a diagram showing an entire configuration of a continuous fiber-reinforced thermoplastic resin pellet manufacturing apparatus related to the second embodiment.

In FIG. 5, the numeral 30 denotes a reinforcing fiber bundle delivery device. A reinforcing fiber bundle 2 is drawn out in a successive manner from the inner periphery side of a roving package 21 of a fiber bundle package 20 loaded on the reinforcing fiber bundle delivery device 30.

As shown in FIG. 5, plural (three in the example of FIG. 1) reinforcing fiber bundles 2 drawn out from the roving packages 21 of the fiber bundle packages 20 are arranged and conducted to a pre-heat heating device 5 provided with a pair of heating rollers 6A and 6B. After heated by the pre-heat heating device 5, the reinforcing fiber bundles 2 are conducted into an impregnation die 7. Molten resin (molten thermoplastic resin) 3 is fed into the impregnation die 7 continuously from an extruding machine 10 having a built-in screw 11. In the interior of the impregnation die 7 are disposed plural impregnation rollers 9 for impregnating the reinforcing fiber bundles 2 with the molten resin 3. A die nozzle 8 is attached to an exit of the impregnation die 7. The die nozzle 8 defines the diameter of a continuous fiber-reinforced resin strand 4 of a circular section formed by twisted, resin-impregnated reinforcing fiber bundles.

The molten resin 3 is impregnated into the reinforcing fiber bundles 2 passing through the impregnation die 7, affording resin-impregnated reinforcing fiber bundles. Twisting rollers 13A and 13B disposed on a downstream side of the impregnation die 7 are adapted to twist the resin-impregnated reinforcing fiber bundles. The twisting rollers 13A and 13B function as a withdrawing device and a twisting device. The continuous fiber-reinforced resin strand 4 formed by the twisted, resin-impregnated reinforcing fiber bundles is withdrawn continuously from the impregnation die 7 by the twisting rollers 13A and 13B.

The continuous fiber-reinforced resin strand 4 of a high temperature drawn out from the die nozzle 8 in the impregnation die 7 is cooled and hardened in a cooling water bath 12 and is conducted to the twisting rollers 13A and 13B. The continuous fiber-reinforced resin strand 4 conducted to a downstream side of the twisting rollers 13A and 13B is cut into a predetermined length by a pelletizer 14, affording a continuous fiber-reinforced resin pellet.

As shown in the above FIG. 2, rotational axes of the pair of twisting rollers 13A and 13B are positioned on parallel planes (horizontal planes) respectively so as to cross each other in a plan view as seen in a direction orthogonal to the planes. In this state the twisting rollers 13A and 13B are disposed in opposition to each other so as to sandwich therebetween the continuous fiber-reinforced resin strand 4 fed from the upstream side. That is, in a plan view, the rotational axis, a, of the twisting roller 13A as an upper roller in FIG. 2 and the rotational axis of the twisting roller 13B as a lower roller in the same figure are shifted in directions opposite to each other with respect to the withdrawing direction of the continuous fiber-reinforced resin stand 4 and by the same predetermined angle (a twisting angle θ1, see FIG. 3).

Next, a description will be given below about the reinforcing fiber bundle delivery device 30.

Figure 6:
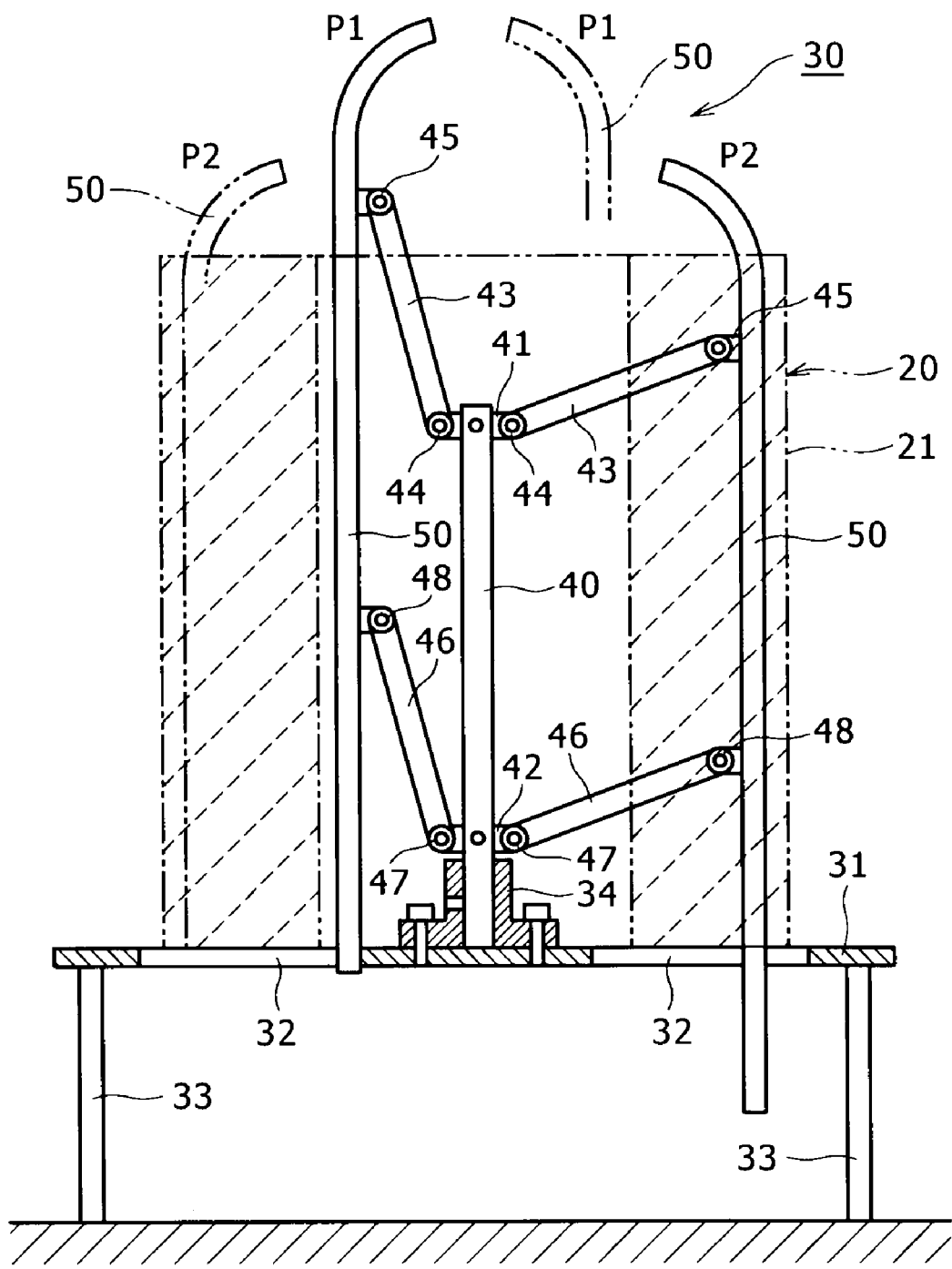
FIG. 6 is a diagram showing the configuration of a reinforcing fiber bundle delivery device in FIG. 5.
Figure 7:
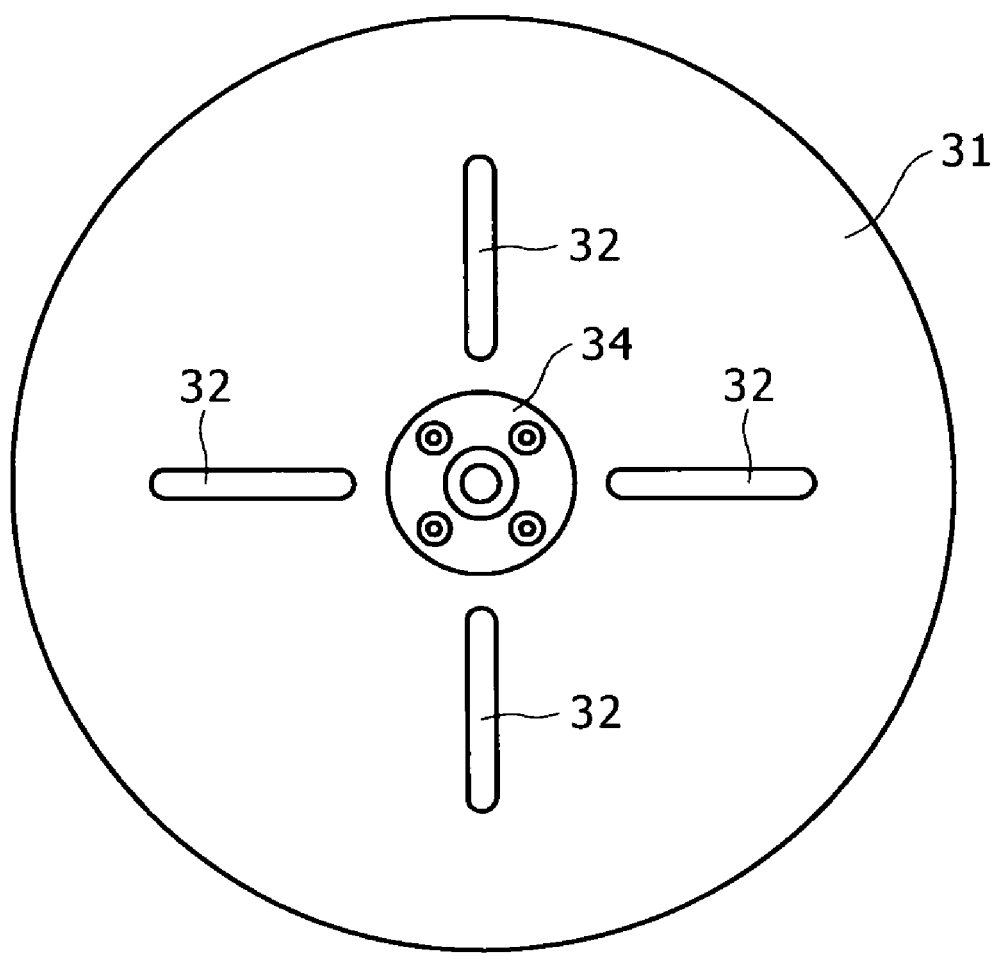
FIG. 7 is a plan view showing a base plate in FIG. 6.
Figure 8:
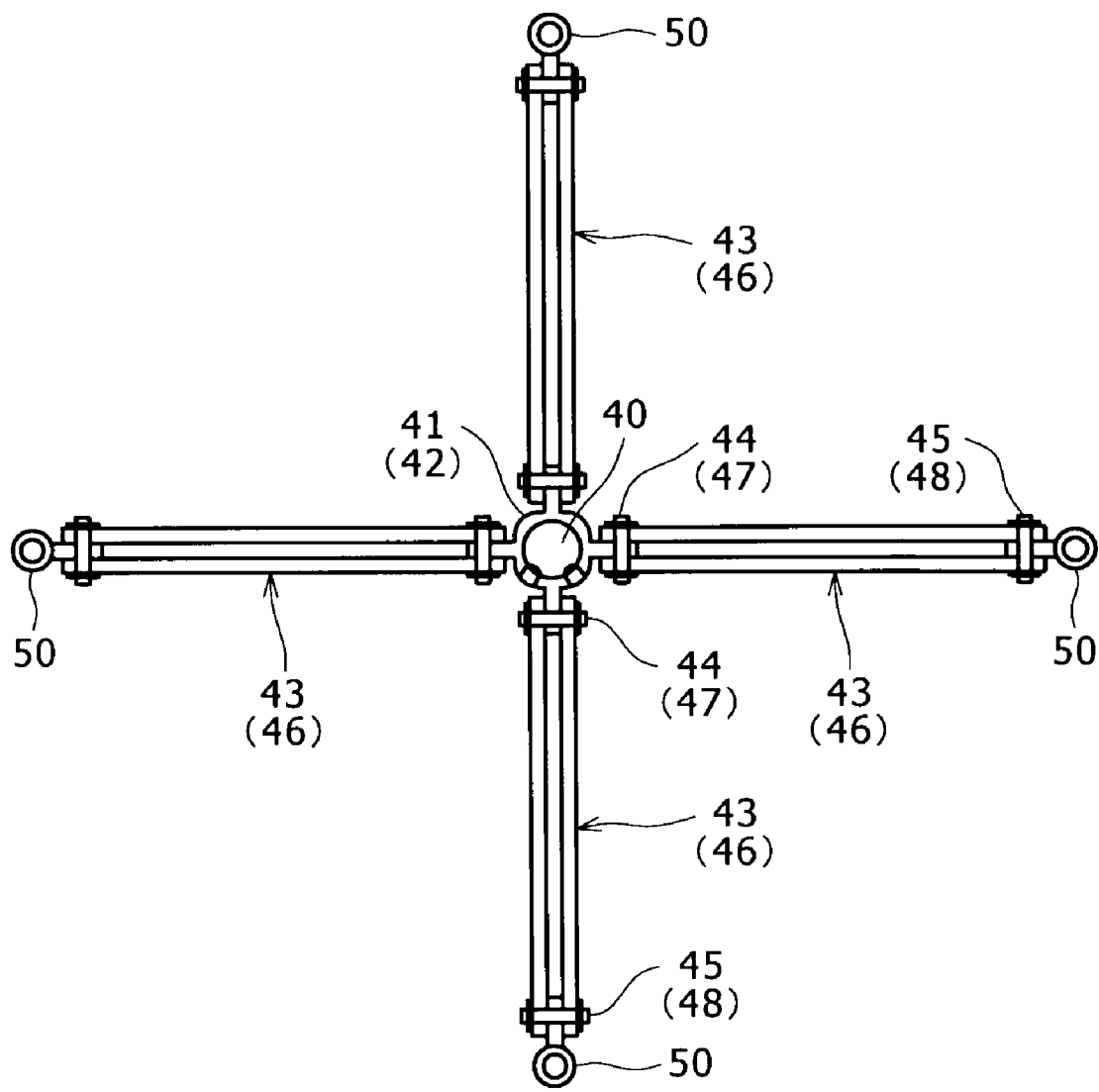
FIG. 8 is a plan view showing the configuration of a principal portion of the reinforcing fiber bundle delivery device shown in FIG. 6.

FIG. 6 is a diagram showing the configuration of the reinforcing fiber bundle delivery device in FIG. 5. FIG. 7 is a plan view showing a base plate in FIG. 6. FIG. 8 is a plan view showing the configuration of a principal portion of the reinforcing fiber bundle delivery device shown in FIG. 6. In FIG. 6, a heat-shrinkable film 22 of the fiber bundle package 20, an umbrella-like guide 35 and an anti-floating metallic piece 36 are not shown.

In FIGS. 6 to 8, the numeral 31 denotes a disc-like base plate. Support legs 33 having a predetermine length and abutted against a floor surface are attached to the base plate 31. A support pillar 40 having an upper hub 41 and a lower hub 42 is erected vertically on the base plate 31. Numeral 34 denotes a bracket fixed at a central position of an upper surface of the base plate 31 and supporting the support pillar 40. The support pillar 40 is fixed to the bracket 34 removably. With the fiber bundle package 20 placed on the base plate 31, the axis of the fiber bundle package 20 (roving package 21) and that of the support pillar 40 are both positioned substantially on one and same line.

Numeral 50 denotes a collapse suppressing rod constituted by a hollow pipe. In this embodiment a total of four collapse suppressing rods 50 are disposed at positions equally dividing the circumference centered on the support pillar 40 by an angle of 90° (see FIG. 8). The collapse suppressing rods 50 extend throughout the overall length in the height direction of the roving package 21. More particularly, the collapse suppressing rods 50 each have a length larger than the height dimension of the roving package 21. An upper end portion of each collapse suppressing rod 50 is bent inwards lest the reinforcing fiber bundle 2 drawn out from the roving package 21 should be caught on the upper end portion. The four collapse suppressing rods 50 constitute winding layers' collapse suppressing members which are for pushing the inner periphery surface of the roving package 21 outwards. It is preferable that the number of the collapse suppressing rods 50 be two or more, more preferably 4 to 8.

Numeral 43 denotes an upper link. A base end portion of the upper link 43 is supported on the upper hub 41 of the support pillar 40 pivotably through a pin 44 which extends in a direction orthogonal to the axis of the support pillar 40. On the other hand, a front end portion of the upper link 43 is supported on an upper end portion of the associated collapse suppressing rod 50 pivotably through a pin 45 which is parallel to the pin 44.

Numeral 46 denotes a lower link. A base end portion of the lower link 46 is supported on the lower hub 42 of the support pillar 40 pivotably through a pin 47 which extends in a direction orthogonal to the axis of the support pillar 40. On the other hand, a front end portion of the lower link 46 is supported on a lower portion of the associated collapse suppressing rod 50 pivotably through a pin 48 which is parallel to the pin 47.

That is, a parallel link mechanism is formed by the links 43, 46, support pillar 40 and collapse suppressing rods 50. In this parallel link mechanism, when the links 43 and 46 assume an attitude facing in the direction orthogonal to the axis of the support pillar 40, each collapse suppressing rod 50 assumes a position equal to or more outer than the outer periphery surface of the roving package 21. Therefore, by mounting the roving package 21 outside the support pillar 40 in an upwardly inclined state of the links 43 and 46 so that the front end sides of the links 43 and 46 are up, the own weight of each of the collapse suppressing rods causes the same rod to follow the inner periphery surface of the roving package 21 as the inner periphery surface of the roving package displaces itself outwards.

In order that the four collapse suppressing rods 50 which thus follow the inner periphery surface of the roving package may not come into abutment against the base plate 31, four elongated holes 32 are formed so as to extend vertically through the base plate 31 and extend radially from the support pillar 40. That is, lower end portions of the collapse suppressing rods 50 move toward and away from the support pillar 40 along the elongated holes 32 (see FIGS. 3 and 4) formed in the base plate 31 in a state in which they extend through the elongated holes 32 at all times.

In this embodiment the support pillar 40 and the four sets of links 43, 46 constitute pushing means for pushing the four collapse suppressing rods 50 against the inner periphery surface of the roving package 21, following the inner periphery surface of the roving package 21 whose thickness becomes smaller gradually as the reinforcing fiber bundle 2 is drawn out in a successive manner.

Figure 9:
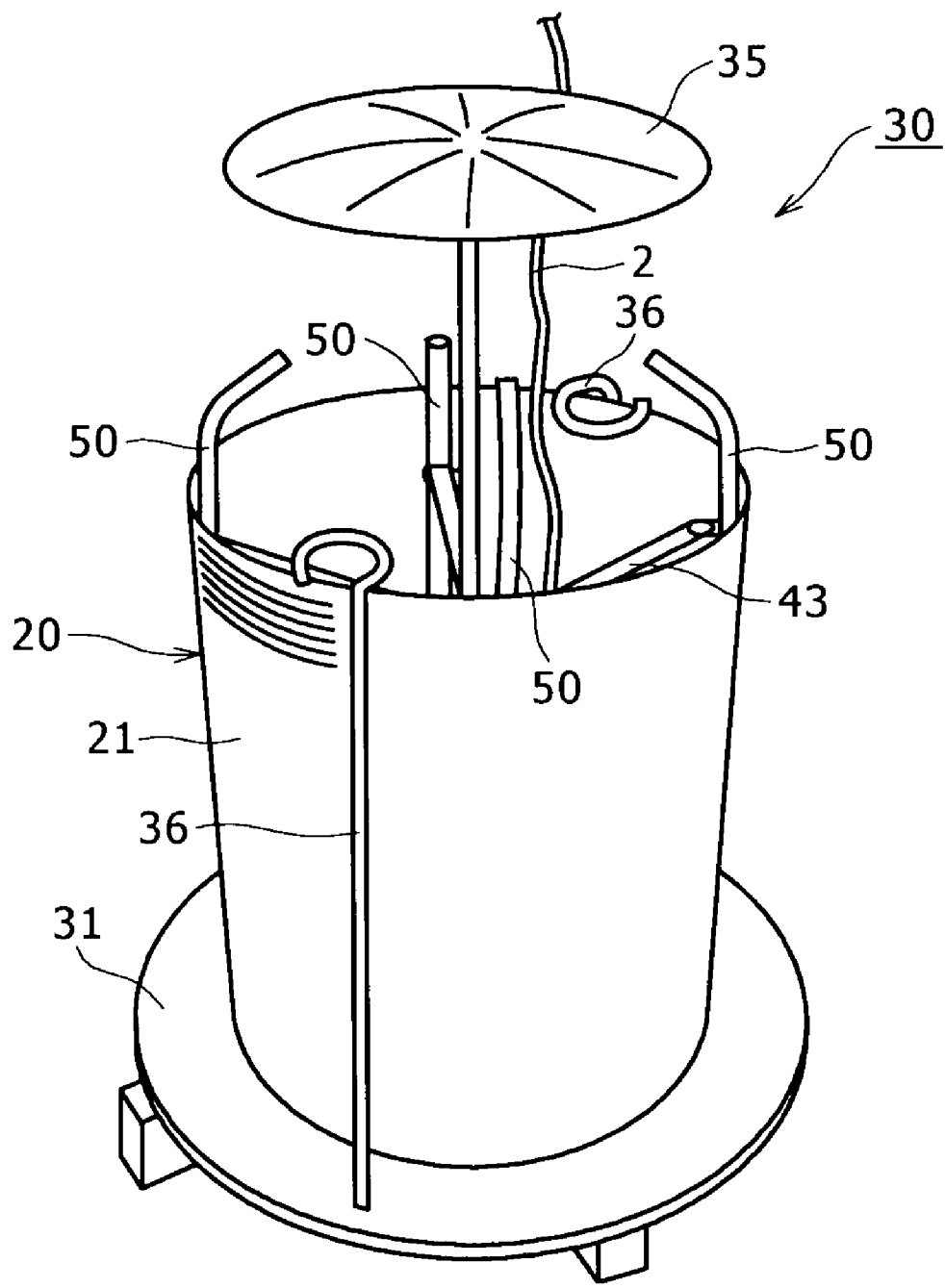
FIG. 9 is a perspective view showing the manner in which a reinforcing fiber bundle is drawn out from a roving package in the reinforcing fiber bundle delivery device shown in FIG. 6.
Figure 10:
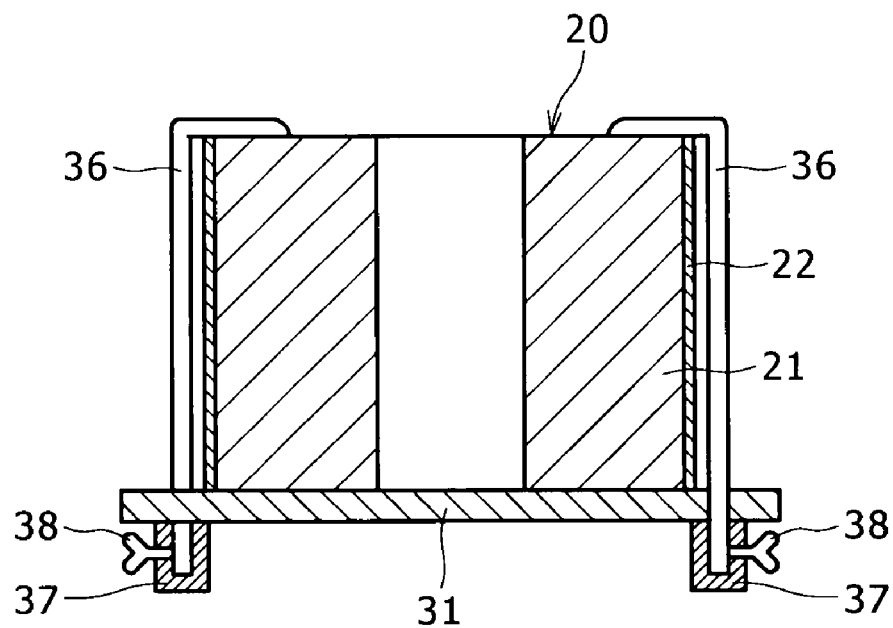
FIG. 10 is a sectional view showing an anti-floating metallic piece in FIG. 9.

FIG. 9 is a perspective view showing the manner in which the reinforcing fiber bundle is drawn out from the roving package in the reinforcing fiber bundle delivery device shown in FIG. 6. FIG. 10 is a sectional view showing an anti-floating metallic piece in FIG. 9.

In FIG. 9, the numeral 35 denotes an umbrella-like guide. The umbrella-like guide 35 has a rod-like portion and an umbrella portion. In the umbrella-like guide 35 which is in a stand-up attitude, a lower end of the rod-like portion is fixed to an upper end of the support pillar 40 removably. The reinforcing fiber bundle 2 drawn out from the roving package 21 is conducted upward while contacting the circumferential edge of the umbrella portion of the umbrella-like guide 35. The size of the umbrella portion of the umbrella-like guide 35 is set so that while the reinforcing fiber bundle 2 is drawn out, the circumferential edge of the umbrella portion is positioned radially outwards with respect to upper end portions of the collapse suppressing members (e.g., collapse suppressing rods). The shape of the umbrella portion of the umbrella-like guide 35 is not limited to the conical disc-like (umbrella-like) shape projecting upwards from the outer periphery portion toward the central portion. It may be a disc-like shape.

In FIGS. 9 and 10, the numeral 36 denotes an anti-floating metallic piece. In this embodiment the anti-floating metallic piece 36 is disposed outside the fiber bundle package 20 and has a rod-like portion extending in the height direction of the fiber bundle package 20 and a head portion which is bent from an upper portion of the rod-like portion to hold down the peripheral edge portion of an upper surface of the fiber bundle package 20. The head portion is in C shape when seen in plan. The two anti-floating metallic pieces 36 are respectively inserted into bosses 37 fixed to the base plate 31 and are fixed to the bosses 37 with fixing bolts 38. In a certain type of a fiber bundle package 20 a heat-shrinkable film 22 is affixed to the outermost winding layer of the reinforcing fiber bundle 2. There sometimes is a case where the outermost winding layer of the reinforcing fiber bundle 2 floats together with the heat-shrinkable film 22. The anti-floating metallic piece 36 is provided to prevent the occurrence of such an inconvenience. Preferably, the anti-floating metallic piece 36 is provided so that it can hold down at least two positions in the periphery edge portion of the upper surface of the fiber bundle package 20 which positions do not intersect the path of movement of the collapse suppressing rods 50.

In the reinforcing fiber bundle delivery device 30 thus constructed, the fiber bundle package 20 is first mounted. As the fiber bundle package 20 there was used one in which the heat-shrinkable film 22 had been removed beforehand from upper and lower surfaces of the roving package 21 and the outer periphery surface of the roving package 21 had been coated with the heat-shrinkable film 22. After removal of the umbrella-like guide 35 fixed to the support pillar 40, the four collapse suppressing rods 50 are moved to positions indicated at P1 in FIG. 6. Next, the fiber bundle package 20 is brought down from above the four collapse suppressing rods 50, and in a state in which the four collapse suppressing rods 50 are inserted inside the fiber bundle package 20, the fiber bundle package 20 is placed on the base plate 31. In this state, the axis of the roving package 21 of the fiber bundle package 20 is aligned with the axis of the support pillar 40. The inner periphery surface of the roving package 21 assumes a state of being pushed radially outwards by the four collapse suppressing rods 50. When the mounting of the fiber bundle package 20 is thus completed, the umbrella-like guide 35 is fixed to the support pillar 40. Also, the anti-floating metallic piece 36 is mounted.

When the mounting of the fiber bundle package 20 is over, the reinforcing fiber bundle 2 is drawn out in a successive manner from the roving package 21 by the operation of the twisting rollers 13A and 13B described above. As a result, the thickness of the roving package 21 gradually becomes smaller. That is, the inner periphery surface of the roving package 21 displaces itself outwards gradually. With the parallel link mechanism described above, the four collapse suppressing rods 50 move following the outwards displacing inner periphery surface of the roving package 21 and is pushed against the inner periphery surface constantly.

As mentioned above, the outer periphery surface of the roving package 21 loaded to the reinforcing fiber bundle delivery device is coated with the heat-shrinkable film 22. The winding layers of the roving package 21 after the loading are in a sandwiched state between the heat-shrinkable film 22 and the collapse suppressing rods 50 at four positions in the circumferential direction in this embodiment. Thus, with the four collapse suppressing rods 50 pushed against the inner periphery surface of the roving package 21, the winding layers of the roving package 21 can be supported firmly so as not to be collapsed. In the case where the pushing force can be imparted continuously toward the inner periphery surface of the roving package 21, the heat-shrinkable film 22 may all be removed beforehand from the roving package 21.

When the reinforcing fiber bundle 2 is drawn out up to near the outermost winding layer of the roving package 21, the four collapse suppressing rods 50 shift to positions indicated at P2 in FIG. 6 and support the inner surface of the roving package 21, so that it is possible to suppress the collapse of winding layers and hence possible to suppress entanglement of the reinforcing fiber bundle 2. Therefore, it is possible to effect switching to the new roving package spliced to the reinforcing fiber bundle 2 while suppressing the occurrence of breaking of the reinforcing fiber bundle 2 which is caused by the aforesaid entanglement in the pass line for conducting the reinforcing fiber bundle 2 to the impregnation die 7. Consequently, the manufacture of continuous fiber-reinforced thermoplastic resin pellets can be done continuously over a long time.

In this embodiment, instead of the plural collapse suppressing rods 50 there may be used plural curved plates as the plural collapse suppressing members. The curved plates each have an outer surface shape conforming to the curved shape of the inner periphery surface of the roving package 21. Further, as pushing means for pushing the collapse suppressing rods 50 there may be used air cylinders or electric direct-acting actuators. The use of air cylinders or electric direct-acting actuators is advantageous in that the pushing force can be maintained constant over a period from a maximum wound state of the reinforcing fiber bundle 2 up to just before a drawn-out stage of the reinforcing fiber bundle 2 to near the outermost winding layer.

Next, a description will be given about examples related to the above second embodiment. An experiment for manufacturing continuous fiber-reinforced resin pellets was conduced using the manufacturing apparatus shown in FIG. 5 and the reinforcing fiber bundle delivery device shown in FIGS. 6 to 10 was evaluated. Glass fiber bundles were used as the reinforcing fiber bundles. The specification (configuration) of each glass fiber bundle is as follows, glass fiber dia. (filament dia.) 17 μm, weight 2400 g/km. Even in the case of fiber bundle packages using glass fiber bundles of the same specification, there is a difference in the easiness of collapse occurrence of winding layers, depending on manufacturers, so there were used two kinds of fiber bundle packages (fiber bundle packages G, H) of different manufacturers. Dimensions of each fiber bundle package are as follows, outside dia.: φ 300 mm, inside dia.: φ 150 mm, height: 330 mm. In the fiber bundle packages used, heat-shrinkable films covering both upper and lower surfaces of the roving packages had been removed and the outer periphery surfaces of the roving packages had been coated with heat-shrinkable films.

Example 1

The following conditions were adopted as experimental conditions. Fiber bundle packages: 3 packages, manufacturing speed (withdrawing speed): 80 m/min, thermoplastic resin: polypropylene, fiber content: about 70%, twisting angle θ1 of each twisting roller: 17.5°. As shown in FIG. 5, the three fiber bundle packages are each loaded to the reinforcing fiber bundle delivery device. A total of three reinforcing fiber bundles drawn out respectively from the three fiber bundle packages are introduced into the impregnation die through the pass line.

As a result, with respect to the fiber bundle package G, a total of ten fiber bundle package switching runs were conducted without occurrence of breaking. Also with respect to the fiber bundle package H, a total ten fiber bundle package switching runs were conducted without causing breakage.

Comparative Example 1

There were adopted the same experimental conditions as in Example 1. There were used reinforcing fiber bundle delivery devices provided with neither collapse suppressing members nor pushing means. With respect to the fiber bundle package G, a total of ten fiber bundle package switching runs were conducted, of which eight runs could be carried out without causing breakage. With respect to the fiber bundle package H, a total of ten fiber bundle package switching runs were conducted, of which only three runs could be carried out without causing breakage.

Third Embodiment

Figure 12:
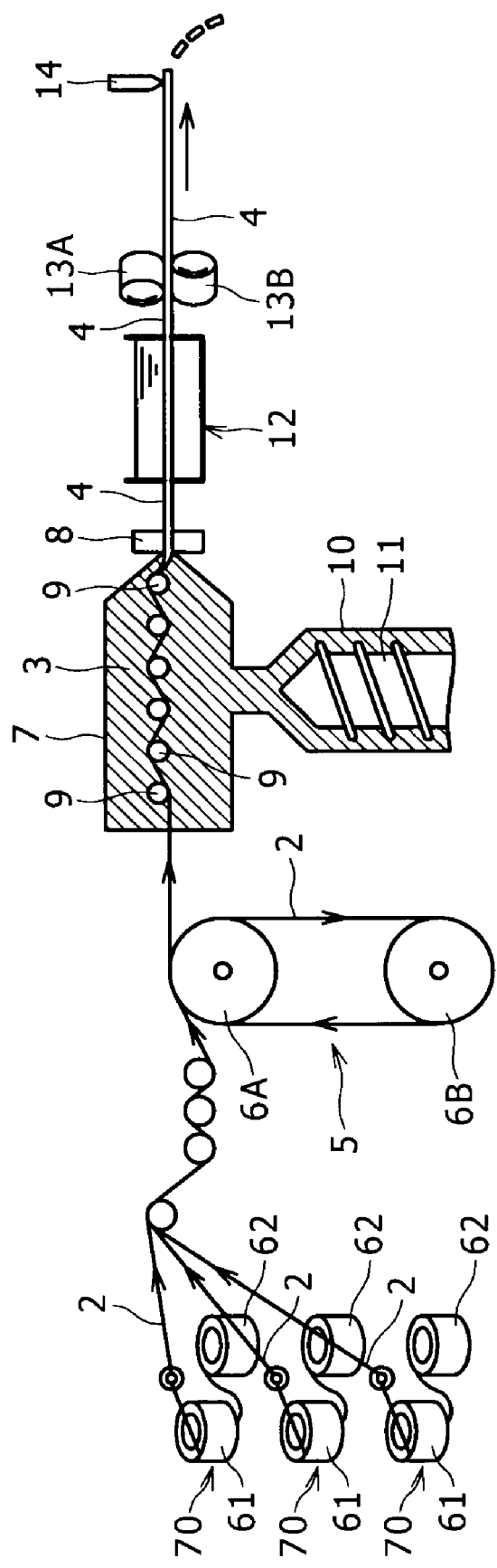
FIG. 12 is a diagram showing an entire configuration of a continuous fiber-reinforced thermoplastic resin pellet manufacturing apparatus according to an embodiment (third embodiment) related to the third invention.

A further embodiment (third embodiment) related to the third invention will be described below while making reference to the drawings. FIG. 12 is a diagram showing an entire configuration of a continuous fiber-reinforced thermoplastic resin pellet manufacturing apparatus according to the third embodiment.

In FIG. 12, the numeral 70 denotes a reinforcing fiber bundle delivery device to be described later. The continuous fiber-reinforced thermoplastic resin pellet manufacturing apparatus of this embodiment is provided with three reinforcing fiber bundle delivery devices 70.

As shown in FIG. 12, three reinforcing fiber bundles 2 drawn out from roving packages 61 (62) in the reinforcing fiber bundle delivery devices 70 are arranged and conducted to a pre-heat heating device 5 provided with a pair of heating rollers 6A and 6B. The reinforcing fiber bundles 2 are heated by the pre-heat heating device 5 and are then conducted into an impregnation die 7. Molten resin (molten thermoplastic resin) 3 is fed to the impregnation die 7 continuously from an extruding machine 10 having a built-in screw 11. In the interior of the impregnation die 7 are disposed plural impregnation rollers 9 for impregnating the reinforcing fiber bundles 2 with the molten resin 3. A die nozzle 8 is attached to an exit of the impregnation die 7 to define the diameter of a continuous fiber-reinforced resin strand 4 of a circular section constituted by twisted, resin-impregnated reinforcing fiber bundles.

The molten resin is impregnated into the reinforcing fiber bundles 2 passing through the impregnation die 7, affording resin-impregnated reinforcing fiber bundles. Twisting rollers 13A and 13B are disposed on a downstream side of the impregnation die 7 to twist the resin-impregnated reinforcing fiber bundles. The twisting rollers 13A and 13B function as a twisting device and a withdrawing device. The continuous fiber-reinforced resin strand 4 constituted by the twisted, resin-impregnated reinforcing fiber bundles is withdrawn continuously from the impregnation die 7 by the twisting rollers 13A and 13B.

The continuous fiber-reinforced resin strand 4 of a high temperature drawn out from the die nozzle 8 of the impregnation die 7 is cooled and hardened in a cooling water bath 12 and is conducted to the twisting rollers 13A and 13B. The continuous fiber-reinforced resin strand 4 conducted to a downstream side of the twisting rollers 13A and 13B is cut into a predetermined length by a pelletizer 14, affording a continuous fiber-reinforced resin pellet.

As shown in the above FIG. 2, rotational axes of the pair of twisting rollers 13A and 13B are positioned on parallel planes (horizontal planes) respectively so as to cross each other in a plan view as seen in a direction orthogonal to the planes. In this state the twisting rollers 13A and 13B are disposed in opposition to each other so as to sandwich therebetween the continuous fiber-reinforced resin strand 4 fed from the upstream side. That is, in a plan view, the rotational axis, a, of the twisting roller 13A as an upper roller in FIG. 2 and the rotational axis of the twisting roller 13B as a lower roller in the same figure are shifted in directions opposite to each other with respect to the withdrawing direction of the continuous fiber-reinforced resin stand 4 and by the same predetermined angle (a twisting angle $\theta 1$, see FIG. 3).

Next, a description will be given below about the reinforcing fiber bundle delivery device 70.

Figure 13:
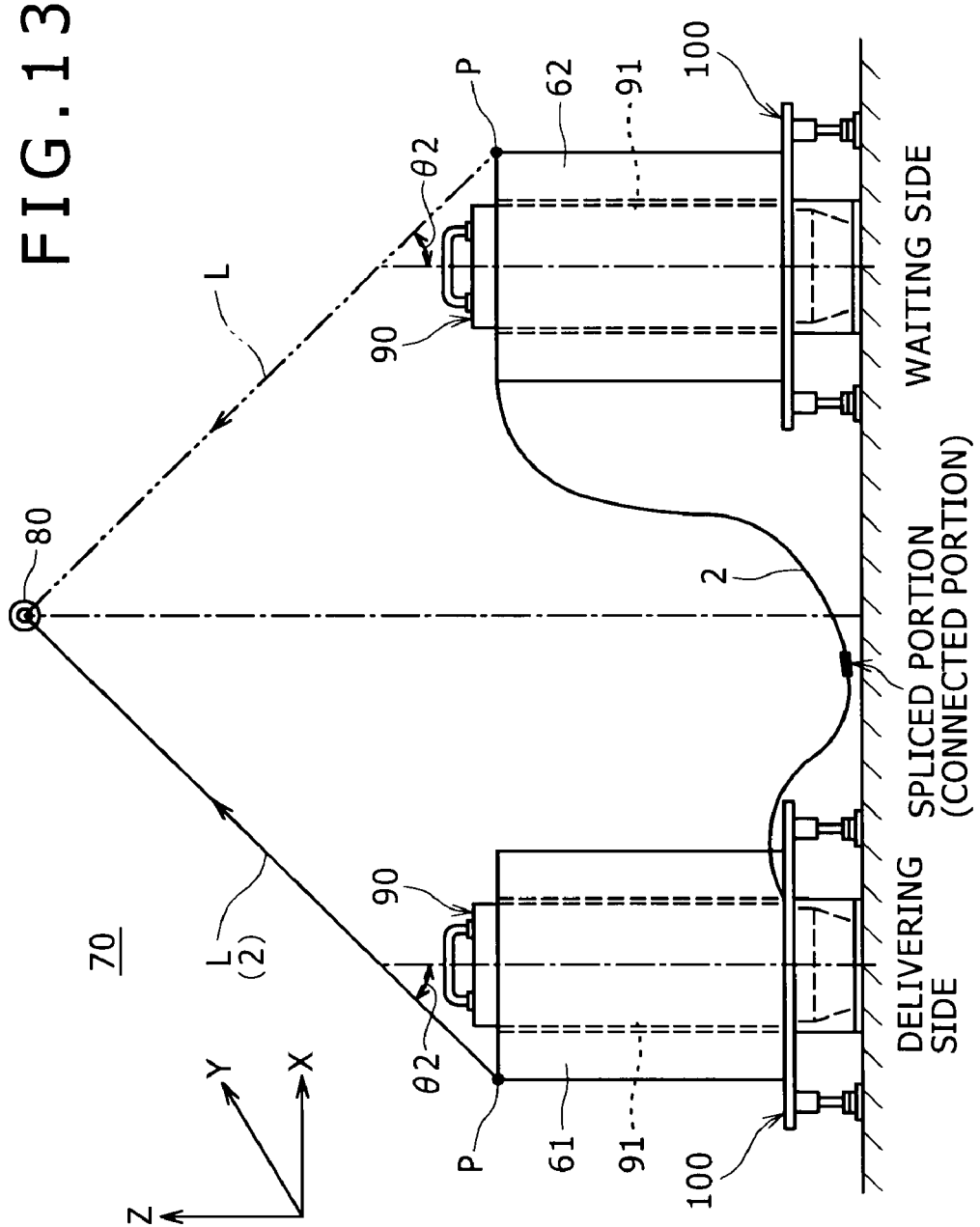
FIG. 13 is a front view showing an entire configuration of a reinforcing fiber bundle delivery device related to the third embodiment.
Figure 14:
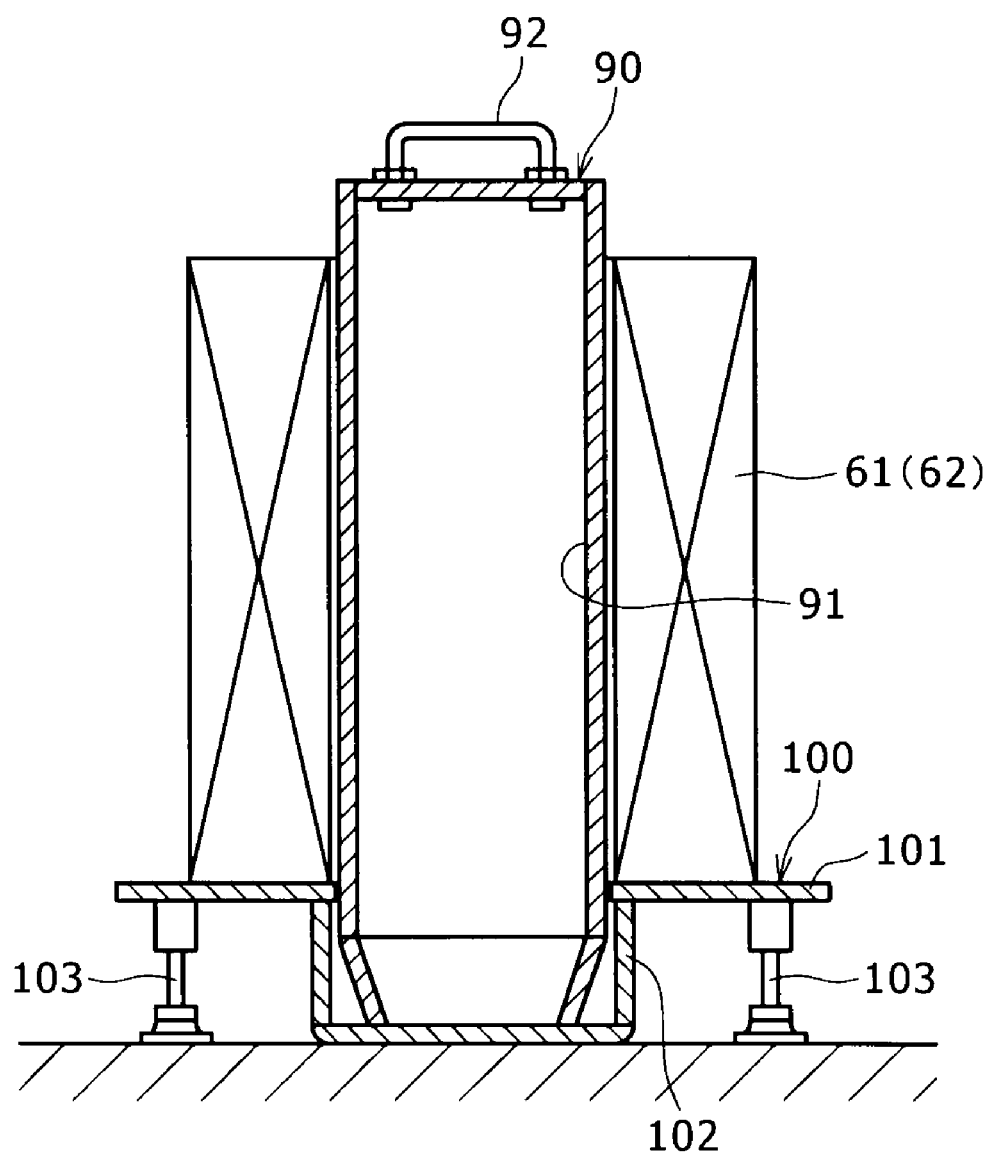
FIG. 14 is a sectional view showing a principal portion of the reinforcing fiber bundle delivery device shown in FIG. 13.

FIG. 13 is a front view showing an entire configuration of the reinforcing fiber bundle delivery device related to the third embodiment. FIG. 14 is a sectional view showing a principal portion of the reinforcing fiber bundle delivery device shown in FIG. 13.

The reinforcing fiber bundle delivery device related to this embodiment is configured so that it can be loaded with two roving packages 61 and 62. A terminal end of the reinforcing fiber bundle 2 of a roving package (the roving package 61 in the example of FIG. 13) from which the fiber bundle is being taken out and a front end of the reinforcing fiber bundle 2 of a roving package (the roving package 62 in the example of FIG. 13) from which the reinforcing fiber bundle is to be taken out next are connected together (spliced together) beforehand by an operator with using an air splicer or the like. That is, in the reinforcing fiber bundle delivery device 70, it is possible to adopt a method wherein after exhaustion of the reinforcing fiber bundle 2 of one roving package (the roving package 61 in the example of FIG. 13), the one roving package is replaced with a new roving package and a terminal end of the reinforcing fiber bundle 2 of the other roving package (the roving package 62 in FIG. 13) and a front end of the reinforcing fiber bundle 2 of a new roving package are connected with each other. Therefore, while repeating interconnection of the reinforcing fiber bundles 2 of two roving packages, the reinforcing fiber bundles 2 can be fed continuously over a long time and in an alternate manner from two roving packages.

According to the reinforcing fiber bundle delivery device 70 in this embodiment, the reinforcing fiber bundles 2 are taken out alternately by a non-rotation type outside withdrawing method from the two roving packages 61 and 62 which are held in a stand-up attitude. The non-rotation type outside withdrawing method is a method wherein the reinforcing fiber bundles are taken out (drawn out) from the outer periphery sides of roving packages while placing the roving packages for example in a stand-up attitude on a certain thing without rotation thereof.

As shown in FIG. 13, the reinforcing fiber bundle delivery device 70 is provided with roving package tables 100 on which two roving packages 61 and 62 of a coreless cylinder shape are rested respectively and core guides 90 erected on the roving package tables 100 respectively. By placing the roving packages 61 and 62 onto the roving package tables 100 while inserting the core guides 90 inside the roving packages 61 and 62, the roving packages 61 and 62 are held on the roving package tables 100 in an stand-up attitude with respective axes facing in the vertical direction.

The reinforcing fiber bundle delivery device 70 is further provided with a reinforcing fiber bundle take-out guide 80, the reinforcing fiber bundle take-out guide 80 being disposed above the two roving packages 61 and 62 and supporting an intermediate portion of the reinforcing fiber bundle 2 which is conducted from the roving packages 61 and 62 to the impregnation die 7. A through hole for passing therethrough the reinforcing fiber bundle 2 is formed in the reinforcing fiber bundle take-out guide 80. In the example shown in FIG. 13, the reinforcing fiber bundle 2 taken out from the roving package 61 (62) is drawn out to the inner side of the drawing through the reinforcing fiber bundle take-out guide 80.

As shown in FIGS. 13 and 14, the roving package tables 100 are each provided with a bottomed cylinder 102 having an inside diameter almost equal to that of the roving package 61 (62) and an annular table plate 101 fixed to a doughnut-like upper end face of the bottomed cylinder 102 and having an inside diameter almost equal to that of the roving package 61 (62), with the roving package 61 (62) being rested on the table plate 101. Three or four support legs 103 are attached to an underside of the table plate 101. The roving package tables 100 are disposed on a horizontal floor surface.

As shown in FIGS. 13 and 14, the core guides 90 each have an inverted cup-like body 91 with an outside diameter slightly smaller than the inside diameter of the roving package 61 (62). A front end of the body 91 is tapered so as to permit easy insertion thereof into the roving package 61 (62). For example, the body 91 is formed by a thin-walled steel plate. A handle 92 is attached to an upper surface of the body 91. In the case of the body 91 formed of vinyl chloride, static electricity occurred near the innermost winding layer although it is lightweight.

Figure 15:
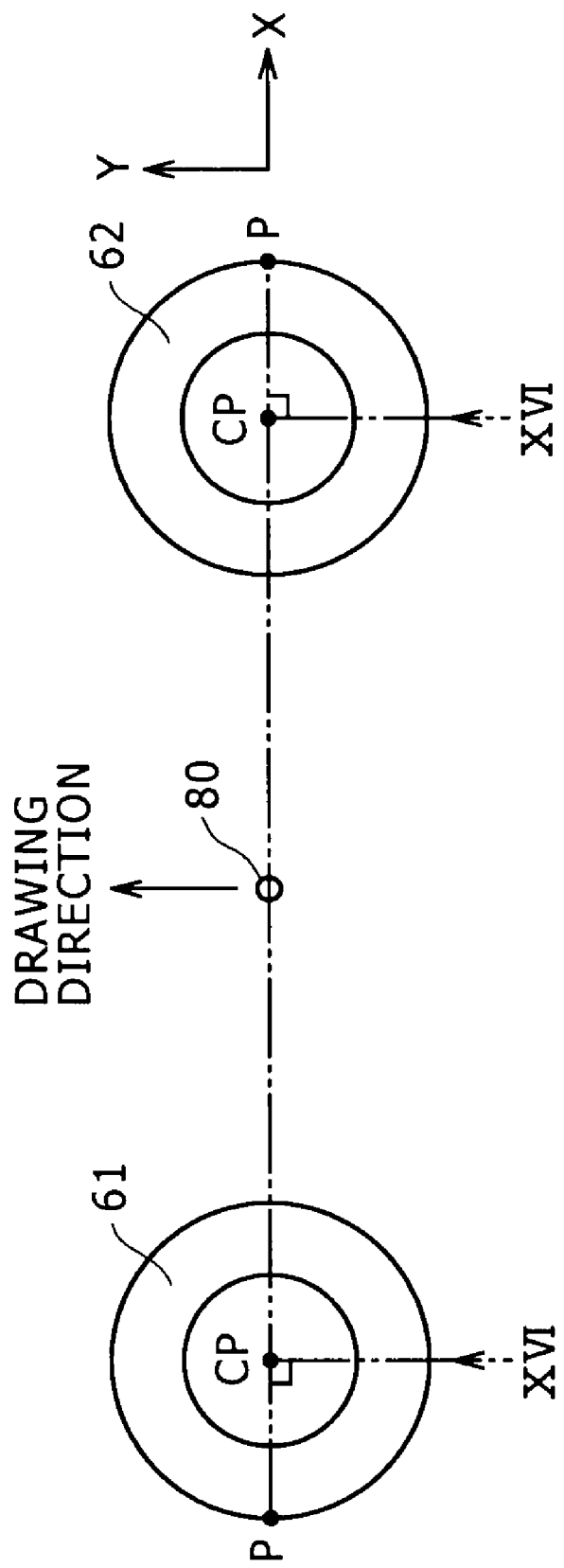
FIG. 15 is a plan view for explaining a take-out angle θ2 in the reinforcing fiber bundle delivery device shown in FIG. 13, showing a positional relation between two roving packages and a reinforcing fiber bundle take-out guide.
Figure 16:
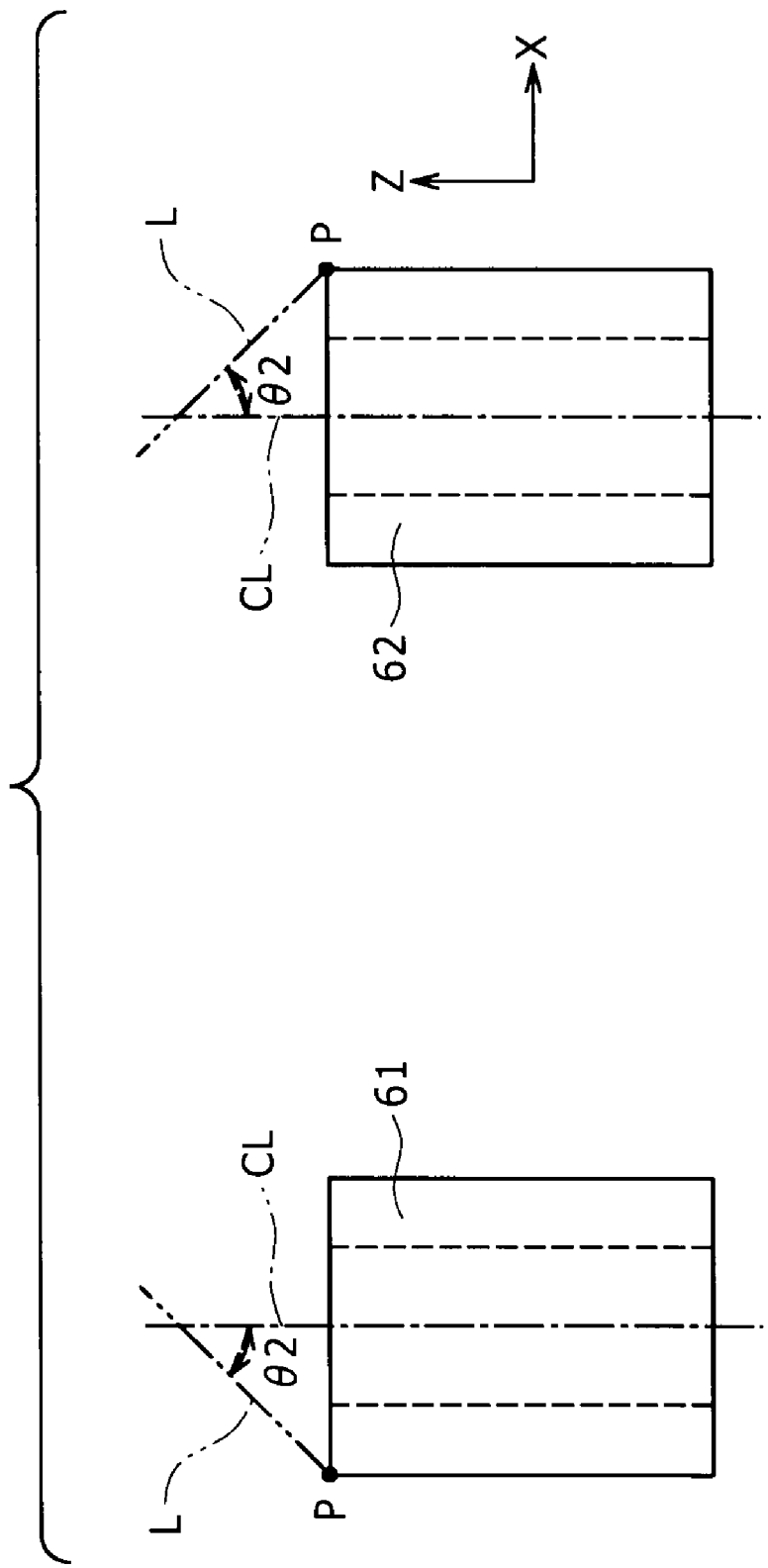
FIG. 16 is a front view of the roving packages in FIG. 15 each as seen in an arrow XVI direction.

Next, the following description is provided about a take-out angle θ2 in the reinforcing fiber bundle delivery device 70. FIG. 15 is a diagram for explaining a take-out angle θ2 in the reinforcing fiber bundle delivery device shown in FIG. 13 and it is a plan view showing a positional relation between two roving packages and the reinforcing fiber bundle take-out guide. FIG. 16 is a front view of the roving packages in FIG. 15 each as seen in an arrow XVI direction.

In Y direction, as shown in the plan view of FIG. 15, the two roving packages 61 and 62 are disposed without positional deviation from each other. As to the reinforcing fiber bundle take-out guide 80, in Y direction, it is disposed at the same position as the roving packages 61 and 62; in Z direction it is disposed above the two roving packages 61 and 62 as shown in the front view of FIG. 13; and in X direction it is disposed at a central position between the two roving packages 61 and 62 as shown in the plan view of FIG. 15.

In the reinforcing fiber bundle delivery device 70, in such a positional relation, at least one of the distances between the roving packages 61 and 62 and the height of the reinforcing fiber bundle take-out guide 80 is adjusted so as to satisfy the following condition. This condition is set as follows. When in a plan view a point of intersection between an extension line, the extension line being an extension of a straight line connecting the reinforcing fiber bundle take-out guide 80 and an axial point CP of each of the roving packages 61 and 62, and an outer circumference of each of the roving packages 61 and 62 is designated a remotest point P, (see FIG. 15), a take-out angle θ2 (see FIG. 16) between a reinforcing fiber bundle pass line PL, the pass line PL connecting the remotest point P and the reinforcing fiber bundle take-out guide 80, and an axis CL of each of the roving packages 61 and 62, is 45° or smaller, in a front view as seen in the direction XVI orthogonal to a vertical plane including the axial point CP and the remotest point P.

For example, given that an outside diameter of each of the roving packages 61 and 62 is φ 265 mm, the distance between the axes CL of the roving packages 61 and 62 is 800 mm, and the height of the reinforcing fiber bundle take-out guide 80 from the level of the table plate 101 is 870 mm, in FIGS. 13 and 15, the take-out angle θ is about 44°. The outside diameter of each of the roving packages 61 and 62 becomes smaller in proportion to the amount of the reinforcing fiber bundle 2 drawn out. The smaller the outside diameter becomes, the smaller the take-out angle θ becomes. In this embodiment, therefore, if the take-out angle θ2 is set so as to become 45° or smaller for roving packages 61 and 62 which have not been used yet, the take-out angle θ2 can be maintained constantly at 45° or smaller irrespective of the outside diameter of each of the roving packages 61 and 62.

Figure 17:
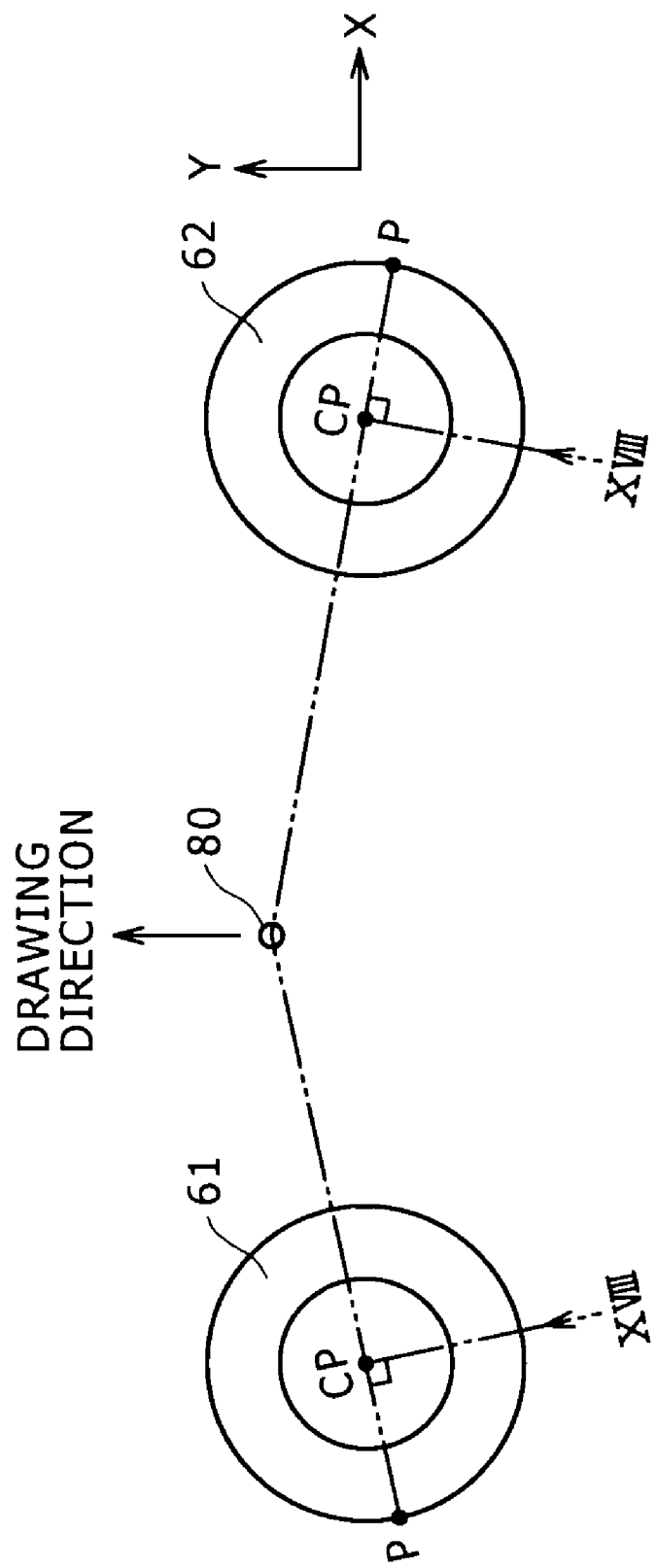
FIG. 17 is an another diagram for explaining a take-out angle in the reinforcing fiber bundle delivery device related to the third invention, and also a plan view showing a layout position relation between two roving packages and the reinforcing fiber bundle take-out guide.
Figure 18:
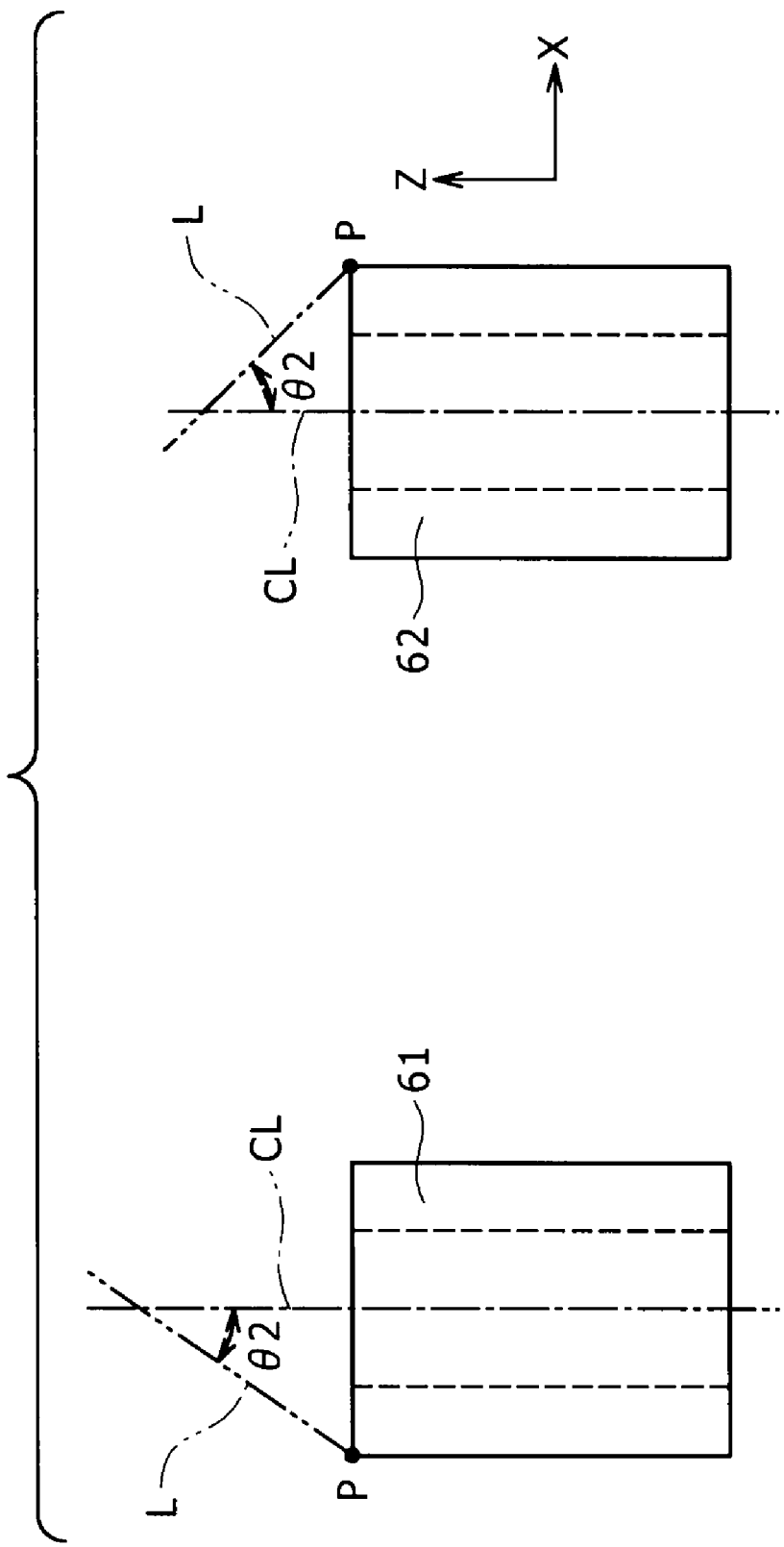
FIG. 18 is a front view of the roving packages in FIG. 17 each as seen in an arrow XVIII direction.

FIG. 17 is another diagram for explaining a take-out angle in the reinforcing fiber bundle delivery device related to the third invention, and also a plan view showing a layout position relation between two roving packages and the reinforcing fiber bundle take-out guide. FIG. 18 is a front view of the roving packages in FIG. 17 each as seen in an arrow XVIII direction.

As shown in the plan view of FIG. 17, the two roving packages 61 and 62 are disposed without positional deviation from each other in Y direction. On the other hand, as to the reinforcing fiber bundle take-out guide 80, in Z direction it is disposed above the two roving packages 61 and 62; in Y direction it is positionally deviated from the roving packages 61 and 62 as shown in the plan view of FIG. 17; and in X direction it is positionally deviated to the roving package 61 side with respect to a central position between the two roving packages 61 and 62.

In the reinforcing fiber bundle delivery device 70, in such a positional relation, at least one of the distance between the roving packages 61 and 62 and the height of the reinforcing fiber bundle take-out guide 80 is adjusted so as to satisfy the following condition, using roving package position adjusting means or guide height adjusting means (neither shown). This condition is as follows. When in a plan view a point of intersection between an extension line, the extension line being an extension of a straight line connecting the reinforcing fiber bundle take-out guide 80 and an axial point CP of each of the roving packages 61 and 62, and an outer circumference of each of the roving packages 61 and 62 is designated a remotest point P, (see FIG. 17), a take-out angle θ2 (see FIG. 18) between a reinforcing fiber bundle pass line PL, the pass line PL connecting the remotest point P and the reinforcing fiber bundle take-out guide 80, and an axis CL of each of the roving packages, is 45° or smaller, in a front view as seen in the direction XVIII orthogonal to a vertical plane including the axial point CP and the remotest point P. Since the roving packages used are specified, if the take-out angle θ2 is initialized, then in the case where subsequent adjustment is not needed, the provision of the roving package position adjusting means and the guide height adjusting means may be omitted. Further, the guide height adjusting means may be replaced by roving package height adjusting means for adjusting an installment height of each roving package.

Thus, the continuous fiber-reinforced thermoplastic resin pellet manufacturing apparatus of this embodiment is provided with the reinforcing fiber bundle delivery device 70, and when taking out reinforcing fiber bundles R alternately from the two series-connected roving packages 61 and 62, the take-out angle θ2 is set as follows. That is, in the case where in a plan view a point of intersection between an extension line, the extension line being an extension of a straight line connecting the reinforcing fiber bundle take-out guide 80 and the axial point CP of each of the roving packages 61 and 62, and an outer circumference of each of the roving packages 61 and 62 is designated a remotest point P, a take-out angle θ2 between a reinforcing fiber bundle pass line PL, the pass line PL connecting the remotest point P and the reinforcing fiber bundle take-out guide 80, and the axis CL of the roving package concerned is 45° or smaller in a front view as seen in a direction orthogonal to a vertical plane including the axial point CP and the remotest point P.

Accordingly, when taking out the reinforcing fiber bundle 2 from the outer periphery side of each of the roving package 61 and 62 by the non-rotation type outside withdrawing method, the reinforcing fiber bundle 2 can be taken out smoothly from the outer periphery side of the roving package while suppressing engagement of the reinforcing fiber bundle 2 with the outer periphery edge portion on the upper end side of the roving package.

The take-out angle θ2 can be made smaller by disposing the reinforcing fiber bundle take-out guide 80 higher. However, a mere higher disposition of the reinforcing fiber bundle take-out guide 80 will result in an increase of the apparatus installing space. Moreover, the larger the take-out angle θ2, the higher the tension developed in the reinforcing fiber bundle 2; besides, fluffing occurs in the reinforcing fiber bundle 2 at the remotest point P. Taking these points into account, it is more preferable that the take-out angle θ2 be in the range of 20° to 34°.

The reinforcing fiber bundle delivery device 70 related to this embodiment is provided with the core guides 90 inserted inside the roving packages 61 and 62 respectively to hold the roving packages 61 and 62 in a stand-up attitude. Therefore, even when the reinforcing fiber bundle 2 is taken out up to near the innermost winding layers of the roving packages 61 and 62, resulting in thinning of the winding layers, it is possible to suppress entanglement of the reinforcing fiber bundle. Thus, also as to the operation for switching to the next roving package connected to one roving package, it can be done positively without failure.

Therefore, according to the continuous fiber-reinforced thermoplastic resin pellet manufacturing apparatus of this embodiment the reinforcing fiber bundle can be fed continuously over a long time to the impregnation the without causing breakage of the reinforcing fiber bundle or failure in the roving package switching operation. Consequently, it is possible to improve the productivity of the continuous fiber-reinforced thermoplastic resin pellet.

Figure 19:
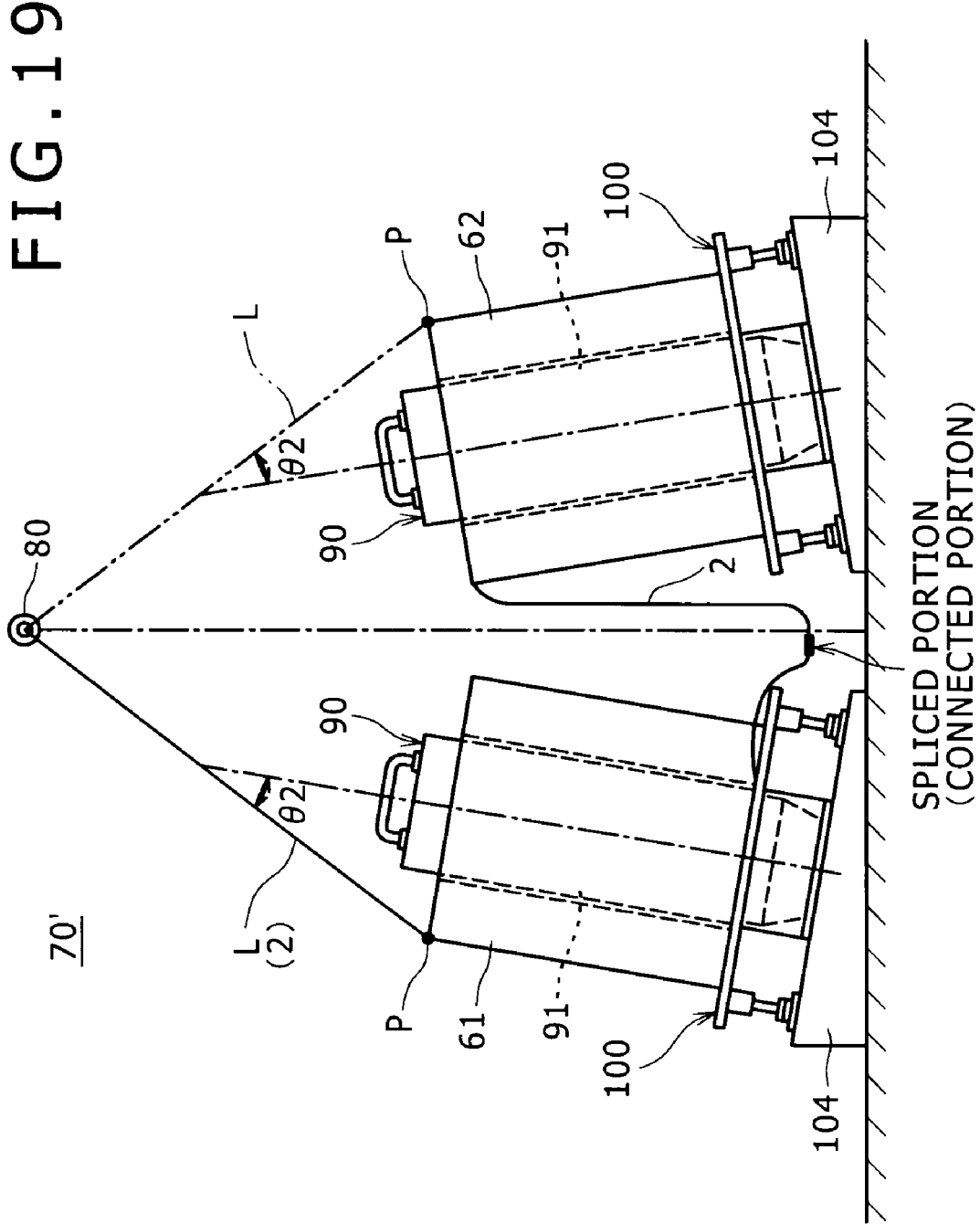
FIG. 19 is a front view showing another entire configuration of a reinforcing fiber bundle delivery device related to the third invention.

FIG. 19 is a front view showing another entire configuration of a reinforcing fiber bundle delivery device related to the third invention. This reinforcing fiber bundle delivery device is of the same configuration as the reinforcing fiber bundle delivery device shown in FIG. 13 except that inclination-forming plates 104 are added.

As shown in FIG. 19, this reinforcing fiber bundle delivery device, indicated at 70', is provided with the inclination-forming plates 104 added to roving package tables 100 respectively. The inclination-forming plates 104 are configured so that they can hold roving packages 61 and 62 in an inclined state of, for example, 10° or so relative to the installation surface so as to allow their axes C1 to approach the reinforcing fiber bundle take-out guide 80 at positions above the roving packages 61 and 62. With this configuration, there accrues an advantage that the height of the reinforcing fiber bundle delivery device 70' can be made low.

Next, the following description is now provided about examples related to the above third embodiment. A continuous fiber-reinforced resin pellet manufacturing experiment was conducted using the manufacturing apparatus shown in FIG. 12 and provided with three reinforcing fiber bundle delivery devices, and the reinforcing fiber bundle delivery device shown in FIGS. 13 to 16 was evaluated. Glass fiber bundles were used as the reinforcing fiber bundles. The specification (configuration) of each glass fiber bundle is as follows, glass fiber dia. (filament dia.) 17 μm, weight 2400 g/km. Dimensions of each roving package are as follows, outside dia.: φ 280 mm, inside dia.: φ 150 mm, height: 330 mm.

Example 1

The following conditions were adopted as experimental conditions. Reinforcing fiber bundle delivery devices: 3 devices, take-out angle θ2: 45°, 34°, manufacturing speed (withdrawing speed): 80 m/min, thermoplastic resin: polypropylene, fiber content: about 70%, twisting angle θ1 of each twisting roller: 17.5°.

Switching of roving packages was performed ten times. As a result, in both the case of the take-out angle θ2 being 45° and the case of it being 34°, there occurred no entanglement of the glass fiber bundle even when the glass fiber bundle was taken out up to near the innermost winding layer of each roving package, and the switching could be done without failure in all of the ten runs. In case of the take-out angle θ2 being 45°, the taken-out glass fiber bundle was rubbed against the outer periphery edge portion on the upper end side of the roving package and the glass fiber was fluffed slightly. On the other hand, in the case of the take-out angle θ2 being 34°, the glass fiber bundle could be taken out smoothly without fluffing.

Comparative Example 1

A manufacturing experiment was performed under the same conditions as in Example 1 except that the core guide was not mounted. As a result, in both the cases of 45° and 34° as take-out angles θ2, there occurred entanglement of the glass fiber bundle near the innermost winding layer of each roving package and the roving package switching operation failed in all of the ten runs.

Comparative Example 2

A manufacturing experiment was performed under the same conditions as in Example 1 except that the take-out angle θ2 was set at 47°. As a result, the glass fiber bundle to be taken out was caught on the outer periphery edge portion on the upper end side of the roving package.

Although the above first to third embodiments have been described as separate embodiments, these embodiments may be combined together.

More specifically, for the continuous fiber-reinforced thermoplastic resin pellet manufacturing apparatus of the first embodiment there may be adopted the reinforcing fiber bundle delivery device 30 related to the second embodiment or the reinforcing fiber bundle delivery device 70 related to the third embodiment.

In the concrete embodiments described above there are mainly included the first to third inventions having the following configurations.

The first invention provides a method for manufacturing a continuous fiber-reinforced thermoplastic resin pellet, comprising the steps of drawing out a reinforcing fiber bundle of a large number of reinforcing filaments continuously from a roving package, introducing the reinforcing fiber bundle thus drawn out from the roving package into an impregnation die continuously, impregnating the thus-introduced reinforcing fiber bundle with molten thermoplastic resin to produce a resin-impregnated reinforcing fiber bundle, twisting the resin-impregnated reinforcing fiber bundle that is passing continuously through the impregnation die by a twisting device disposed on a downstream side of the impregnation die to produce a continuous fiber-reinforced resin strand, and cutting the continuous fiber-reinforced resin strand to produce a pellet while withdrawing the continuous fiber-reinforced resin strand continuously, wherein the step of drawing out the reinforcing fiber bundle continuously from the roving package includes an operation of splicing the reinforcing fiber bundle fed from a roving package being exhausted and the reinforcing fiber bundle fed from a new roving package with each other, the reinforcing fiber bundle splicing operation being carried out in such a manner that, with respect to each of a terminal end portion of the reinforcing fiber bundle from the roving package being exhausted and a start end portion of the reinforcing fiber bundle from the new roving package, a part in a sectional direction orthogonal to the longitudinal direction of the reinforcing fiber bundle concerned is removed over a predetermined range in the longitudinal direction of the reinforcing fiber bundle to form a fiber quantity-halved end portion where the quantity of fibers in the section of the reinforcing fiber bundle is about half of the original fiber quantity, further, the reinforcing filaments in the fiber quantity-halved end portion of the roving package being exhausted and the reinforcing filaments in the fiber quantity-halved end portion of the new roving package are entangled with each other at one or more positions in their longitudinal direction by means of an air splicer, and in a fiber quantity unreduced end portion which is an upstream portion relative to the fiber quantity-halved end portion in the reinforcing fiber bundle of the new roving package and in which the part in the sectional direction remains unremoved, the reinforcing filaments are entangled with each other at one or more positions in their longitudinal direction by means of an air splicer.

By "air splicer" as referred to herein is meant a device for performing an entangling work as is disclosed, for example, in Japanese Patent Laid-Open Publication No. Sho 51 (1976)-19843. By "entangling work" is meant to impart entanglement to filaments by utilizing a turbulent flow of fluid.

According to this first invention it is possible to solve the following conventional problems.

The continuous fiber-reinforced thermoplastic resin pellet (hereinafter also referred to simply as "continuous fiber-reinforced resin pellet") is used as a raw material for injection molding. The continuous fiber-reinforced resin pellet is superior in mechanical strength to a short fiber-reinforced resin pellet because its pellet length (for example, 3~10 mm or so) corresponds as it is to the fiber length.

For manufacturing the continuous fiber-reinforced resin pellet there is used a roving package constituted by a winding of a reinforcing fiber bundle (roving) of a large number of reinforcing filaments. Both pultruding method not involving twisting and pultruding method involving twisting are known as continuous fiber-reinforced resin pellet manufacturing methods.

Figure 21:
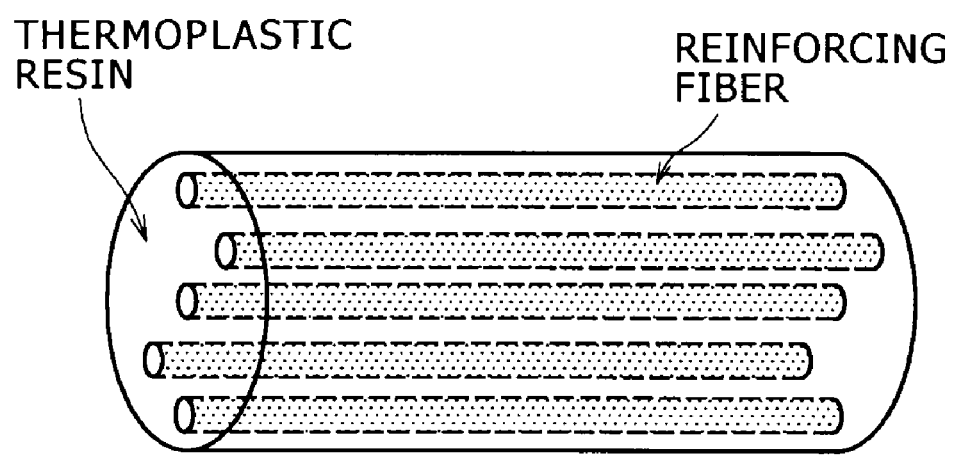
FIG. 21 is a schematic diagram showing a continuous fiber-reinforced resin pellet obtained by a pultruding method not involving twisting.

In the pultruding method not involving twisting, first a reinforcing fiber bundle drawn out from a roving package is introduced continuously into an impregnation die. In the impregnation die, molten thermoplastic resin is impregnated into the reinforcing fiber bundle. A continuous fiber-reinforced resin strand constituted by the resin-impregnated reinforcing fiber bundle is withdrawn continuously from the impregnation die and is cut into a predetermined length to form a continuous fiber-reinforced resin pellet. FIG. 21 is a schematic diagram showing the continuous fiber-reinforced resin pellet obtained by the pultruding method not involving twisting.

Figure 20:
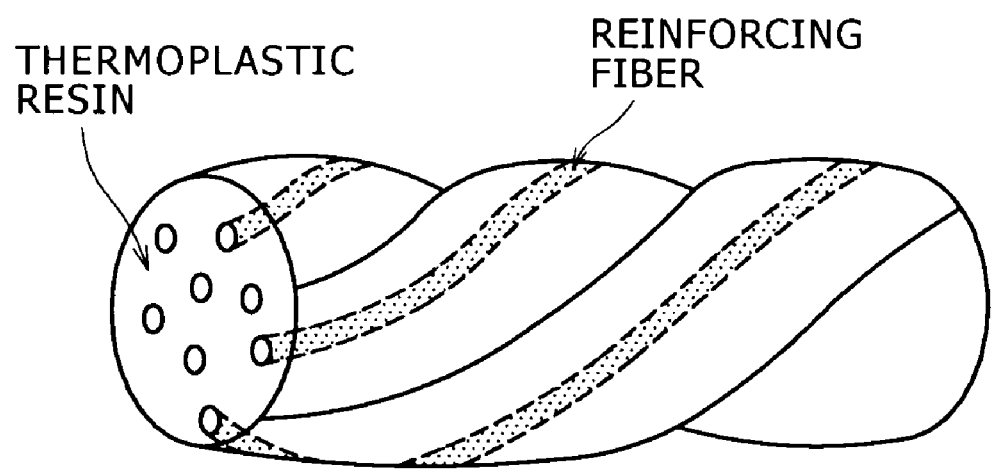
FIG. 20 is a schematic diagram showing a continuous fiber-reinforced resin pellet obtained by a pultruding method involving twisting.

In the pultruding method involving twisting, first a reinforcing fiber bundle drawn out from a roving package is introduced continuously into an impregnation die. In the impregnation die, molten thermoplastic resin is impregnated into the reinforcing fiber bundle. With a twisting device such as twisting rollers or the like disposed on a downstream side of the impregnation die, the resin-impregnated reinforcing fiber bundle which is passing continuously through the impregnation die is twisted. The continuous fiber-reinforced resin strand constituted by the thus twisted, resin-impregnated reinforcing fiber bundle is withdrawn continuously from the impregnation die and is cut into a predetermined length, affording a continuous fiber-reinforced resin pellet. FIG. 20 is a schematic diagram showing the continuous fiber-reinforced resin pellet obtained by the pultruding method involving twisting.

In case of manufacturing a continuous fiber-reinforced resin pellet with use of a reinforcing fiber bundle drawn out continuously from a roving package, it is necessary that the reinforcing fiber bundle of a roving package being exhausted and the reinforcing fiber bundle of a new roving package be spliced to permit a continuous supply of the reinforcing fiber bundle over a long time.

In Japanese Patent Laid-Open Publication No. Hei 6 (1994)-114832 is disclosed a continuous fiber-reinforced resin pellet manufacturing method using the above pultruding method not involving twisting. According to the manufacturing method disclosed therein, a terminal end portion of a reinforcing fiber bundle of a roving package being exhausted and a start end portion of a reinforcing fiber bundle of a new roving package are superimposed one on the other and the thus-superimposed portions are entangled with each other by an air splicer. In this way the reinforcing fiber bundle of the roving package being exhausted and the reinforcing fiber bundle of the new roving package are spliced together (the first related art).

However, in the first related art described above, the fiber quantity in the spliced portion (seam) between the reinforcing fiber bundle of the roving package being exhausted and the reinforcing fiber bundle of the new roving package becomes twice that of each reinforcing fiber bundle. That is, the thickness of the spliced portion becomes larger than the original reinforcing fiber bundle thickness. Consequently, in case of manufacturing a continuous fiber-reinforced resin pellet having a fiber content of about 30% or more, there arises the problem that a spliced portion is apt to be caught in the die nozzle of the impregnation die, causing clogging of the die nozzle, and that breaking of the reinforcing fiber bundle is apt to occur at a high manufacturing speed.

Figure 22:
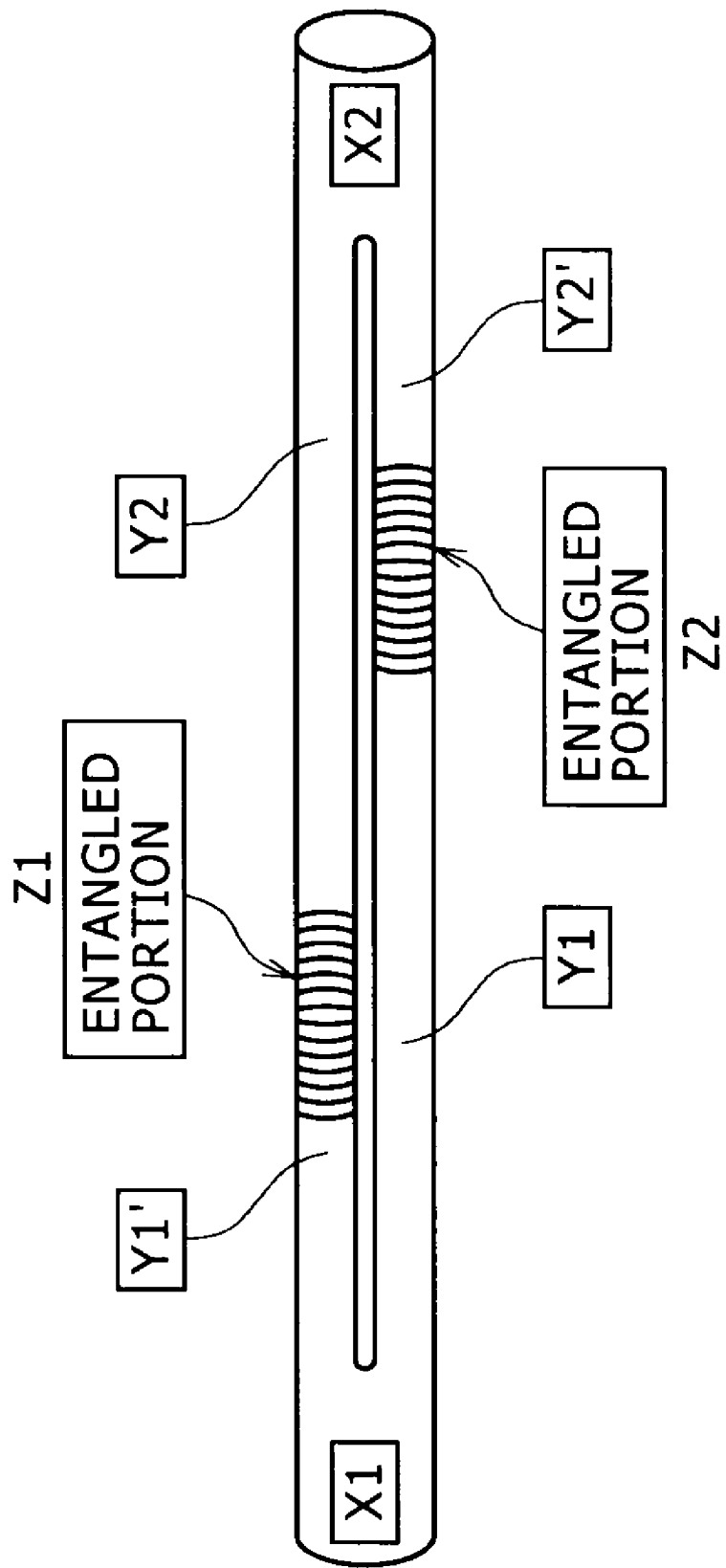
FIG. 22 is a schematic diagram for explaining a second related art.

In Japanese Patent Laid-Open Publication No. 2003-301340 is disclosed a method for splicing fiber bundles with each other (the second related art). The fiber bundles are each constituted by a bundle of a large number of filaments. FIG. 22 is a schematic diagram for explaining the second related art.

The second related art method will now be described. As shown in FIG. 7, one fiber bundle X1 and another fiber bundle X2 are joined in a mutually superimposed manner and thereafter the fiber bundle X1 is halved to form a yarn Y1' and a yarn Y1. Likewise, the fiber bundle X2 is halved to form a yarn Y2 and a yarn Y2'. Then, the yarns Y1' and Y2 are put one on the other and so are the yarns Y1 and Y2'. The yarns Y1' and Y2 are entangled with each other by an air splicer to form an entangled portion Z1. Likewise, the yarns Y1 and Y2' are entangled with each other to form an entangled portion Z2. In this case, the entangled portions Z1 and Z2 are formed at different positions in the longitudinal direction of the fiber bundles.

However, in the second related art described above, the fiber quantity in (Z1+Y1) portion consisting of the entangled portion Z1 and the yarn Y1 becomes 1.5 times that of the fiber bundle X1 and thus the thickness thereof becomes larger than the original thickness of the fiber bundle X1. Likewise, the fiber quantity in (Z2+Y2) portion consisting of the entangled portion Z2 and the yarn Y2 becomes 1.5 times that of the fiber bundle X2 and thus the thickness thereof becomes larger than the original thickness of the fiber bundle X2. Therefore, in case of manufacturing a continuous fiber-reinforced resin pellet having a high fiber content with use of the reinforcing fiber bundles thus spliced by the second related art, there is the problem that the spliced portion having the (Z1+Y1) portion and the (Z2+Y2) portion is caught in the die nozzle of the impregnation die and thus the die is apt to be clogged.

Accordingly, it is an object of the first invention to provide a method for manufacturing a continuous fiber-reinforced thermoplastic resin pellet which method, in manufacturing the continuous fiber-reinforced thermoplastic resin pellet by a pultruding method involving twisting a reinforcing fiber bundle drawn out continuously from a roving package, can cause a spliced portion between the reinforcing fiber bundle of a roving package being exhausted and the reinforcing fiber bundle of a new roving package to pass through a die nozzle of an impregnation the at a high manufacturing speed without causing breakage or the like of the reinforcing fiber bundles.

According to the manufacturing method related to the above first invention, in case of manufacturing a continuous fiber-reinforced thermoplastic resin pellet by the pultruding method which twists reinforcing fiber bundles drawn out continuously from roving packages, the reinforcing fiber bundles can be spliced with each other while suppressing an increase in thickness of the spliced portion beyond the original thickness of each of the reinforcing fiber bundles, by entangling fiber quantity-halved end portions of the reinforcing fiber bundles which end portions each have a fiber quantity about half of the original fiber quantity. Therefore, the reinforcing fiber bundles can be passed through the die nozzle of the impregnation die at a high manufacturing speed without breaking of the reinforcing fiber bundles caused by incapability of passing through the die nozzle or without clogging of the die nozzle caused by fluffs which the clogging becomes a cause stopping the production after passing through the die nozzle. As a result, it is possible to improve the productivity of the continuous fiber-reinforced thermoplastic resin pellet.

In the above splicing operation performed in the above continuous fiber-reinforced thermoplastic resin pellet manufacturing method it is preferable that an adhesive of the same resin as the thermoplastic resin impregnated into the reinforcing fiber bundles be further applied to the entangled portion of the reinforcing filaments entangled by the air splicer.

By so doing it is possible to splice the reinforcing fiber bundles more strongly with each other.

The step of drawing out the reinforcing fiber bundle continuously from each of the roving packages in the above continuous fiber-reinforced thermoplastic resin pellet manufacturing method includes an operation of drawing out the reinforcing fiber bundle in a successive manner from the inner periphery side of the roving package. In connection with this drawing-out operation it is preferable that plural collapse suppressing members pushed radially outwards against the inner periphery surface of the roving package be allowed to shift following the inner periphery surface of the roving package which shifts radially outwards gradually as the reinforcing fiber bundle is drawn out, to suppress collapse of the reinforcing fiber bundle of the roving package.

By so doing, even when the reinforcing fiber bundle is drawn out to near the outermost winding layer of the roving package, it is possible to suppress collapse of the winding layer and hence possible to suppress entanglement of the reinforcing fiber bundle in a collapsed winding layer. Thus, since it is possible to suppress breaking of the reinforcing fiber bundle caused by the entanglement, it is also possible to effect positive switching to a new roving package spliced to the reinforcing fiber bundle in question. In this way continuous fiber-reinforced thermoplastic resin pellets can be manufactured continuously over a long time.

The step of drawing out the reinforcing fiber bundle continuously from the roving package in the above continuous fiber-reinforced thermoplastic resin pellet manufacturing method includes an operation of taking out the reinforcing fiber bundle from the outer periphery side of each of plural spliced roving packages through a reinforcing fiber bundle take-out guide disposed above the roving packages, without causing rotation of the roving packages and while holding the roving packages in an stand-up attitude with the axes thereof facing in the vertical direction. Preferably, in connection with this taking-out operation, the reinforcing fiber bundle is taken out under following conditions. If in a plan view a point of intersection between an extension line of a straight line, the straight line connecting the reinforcing fiber bundle take-out guide and an axial point of each of the roving packages, and an outer circumference of the roving package is assumed to be a remotest point, then in a front view as seen in a direction orthogonal to a vertical plane including the axial point and the remotest point, a take-out angle between a reinforcing fiber bundle pass line, the pass line extending from the remotest point to the reinforcing fiber bundle take-out guide, and an axis of the roving package concerned is always 45° or less irrespective of the diameter of the outer circumference of the roving package.

By so doing, the reinforcing fiber bundle take-out angle is set constantly at 45° or less irrespective of the outer circumference diameter of the roving package, so at the time of taking out the reinforcing fiber bundle from the outer periphery side of each roving package without causing rotation of the roving package, the reinforcing fiber bundle can be taken out smoothly from the outer periphery side of the roving package without the reinforcing fiber bundle being caught on the outer periphery edge portion on the upper end side of the roving package.

Moreover, in the above method, the reinforcing fiber bundle is drawn out from each roving package while holding the roving package in a stand-up attitude, so even when the reinforcing fiber bundle has been taken out up to near the innermost winding layer of the roving package, resulting in the winding layer thickness becoming smaller, it is possible to suppress entanglement of the reinforcing fiber bundle in the winding layer. Thus, it is possible to positively carry out switching to the next roving package connected to the roving package in question.

In the step of drawing out the reinforcing fiber bundle continuously from the roving package in the above continuous fiber-reinforced thermoplastic resin pellet manufacturing method, preferably, two such roving packages are disposed at all times and are connected together, further, after the reinforcing fiber bundle of one of the two roving packages has been exhausted, the one roving package is replaced with a new roving package, and a terminal end of the other roving package and a front end of the new roving package are connected with each other.

By so doing, the reinforcing fiber bundle can be taken out alternately from two roving packages while repeating the connection between the reinforcing fiber bundles of the two roving packages.

The second invention provides an apparatus for manufacturing a continuous fiber-reinforced thermoplastic resin pellet, comprising a roving package constituted by a cylindrical package of a reinforcing fiber bundle, a reinforcing fiber bundle delivery device for drawing out the reinforcing fiber bundle in a successive manner from an inner periphery side of the roving package, an impregnation die for impregnating the reinforcing fiber bundle with molten thermoplastic resin to produce a resin-impregnated reinforcing fiber bundle, the reinforcing fiber bundle being introduced into the impregnation die after being drawn out continuously from the roving package by the reinforcing fiber bundle delivery device, a withdrawing device disposed on a downstream side of the impregnation die to withdraw a continuous fiber-reinforced resin strand of the resin-impregnated reinforcing fiber bundle continuously from the impregnation die, and a cutter member for cutting the continuous fiber-reinforced resin strand, wherein the reinforcing fiber bundle delivery device includes a plurality of collapse suppressing members adapted to be pushed radially outwards against an inner periphery surface of the roving package to suppress collapse of winding layers and pushing means for displacing the plural collapse suppressing members radially outwards following the inner periphery surface of the roving package which inner periphery surface shifts radially outwards gradually as the reinforcing fiber bundle is drawn out in a successive manner.

The "continuous fiber-reinforced thermoplastic resin pellet" to be manufactured by the manufacturing apparatus of the second invention includes both a twisted such pellet and an untwisted such pellet.

According to this second invention it is possible to solve the following conventional problems.

The continuous fiber-reinforced thermoplastic resin pellet (hereinafter referred also simply as "continuous fiber-reinforced resin pellet") is used as a raw material for injection molding. The continuous fiber-reinforced resin pellet is superior in mechanical strength to a short fiber-reinforced resin pellet because its pellet length (for example, 3~10 mm or so) corresponds as it is to the fiber length.

Figure 11:
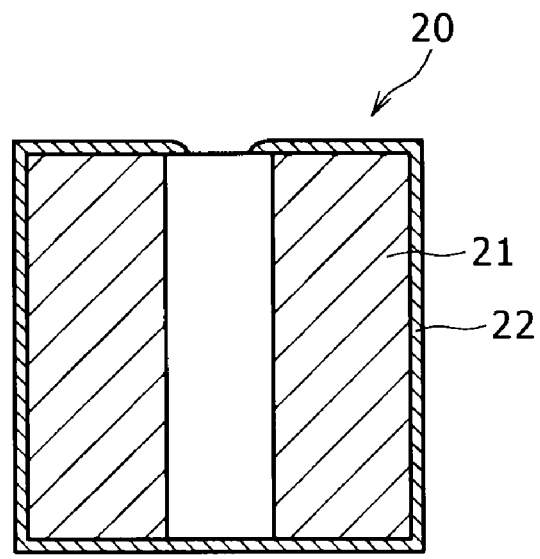
FIG. 11 is a sectional side view showing the configuration of a fiber bundle package.

For manufacturing the continuous fiber-reinforced resin pellet there is used a fiber bundle package. As shown in FIG. 11, the fiber bundle package 20 corresponds to a packaged cylindrical roving package 21 of the reinforcing fiber bundle (roving), an outer surface of the roving package 21 being coated with a packaging heat-shrinkable film 22. The reinforcing fiber bundle is in the shape of a flat string formed by joining a predetermined number of strands without twisting, the strands each being a bundle of a large number of filaments. The reinforcing fiber bundle is drawn out from the roving package of the fiber bundle package 20 by the inside withdrawing method. That is, the reinforcing fiber bundle is drawn out upwards from the inner periphery side of the roving package 21 which is in a stand-up attitude through an opening of the heat-shrinkable film 22.

The continuous fiber-reinforced resin pellet is manufactured by a pultruding method. Both pultruding method not involving twisting and pultruding method involving twisting are known. In the pellet manufacturing method using the pultruding method not involving twisting, first the reinforcing fiber bundle is drawn out continuously from each fiber bundle package and is introduced into an impregnation die. In the impregnation die, the reinforcing fiber bundle is impregnated with molten thermoplastic resin. A continuous fiber-reinforced resin strand constituted by the resin-impregnated reinforcing fiber bundle is withdrawn continuously from the impregnation die by a withdrawing device disposed on a downstream side of the impregnation die. Then, the continuous fiber-reinforced resin strand is cut into a predetermined length by a pelletizer or the like to produce a continuous fiber-reinforced resin pellet. FIG. 21 is a schematic diagram showing the continuous fiber-reinforced resin pellet obtained by the pultruding method not involving twisting.

In the pellet manufacturing method using the pultruding method involving twisting, first the reinforcing fiber bundle is drawn out continuously from each fiber bundle package for inside withdrawal and is introduced into an impregnation die. In the impregnation die, the reinforcing fiber bundle is impregnated with molten thermoplastic resin. The reinforcing fiber bundle which has passed through the impregnation die is twisted and a continuous fiber-reinforced resin strand constituted by the thus-twisted resin-impregnated reinforcing fiber bundle is withdrawn continuously from the impregnation die by a withdrawing device disposed on a downstream side of the impregnation die. Then, the continuous fiber-reinforced resin strand is cut into a predetermined length by a pelletizer or the like to afford a continuous fiber-reinforced resin pellet. In this case, as the withdrawing device there is used one which functions also as a twisting device such as twisting rollers. FIG. 20 is a schematic diagram showing a continuous fiber-reinforced resin pellet obtained by the pultruding method involving twisting.

In case of manufacturing the continuous fiber-reinforced thermoplastic resin pellet while drawing out the reinforcing fiber bundle continuously from each fiber bundle package, the reinforcing fiber bundle is drawn out in a successive manner from the inner periphery side of the roving package concerned. Therefore, the thickness of the roving package becomes smaller gradually as the reinforcing fiber bundle is drawn out. When the reinforcing fiber bundle is drawn out up to near the outermost winding layer of the roving package, collapse of the winding layer has sometimes occurred heretofore with consequent entanglement of the reinforcing fiber bundle in the collapsed winding layer. As a result, breaking of the reinforcing fiber bundle occurs due to the entanglement and it is impossible to make switching to a new fiber bundle package for inside withdrawal spliced to the reinforcing fiber bundle concerned.

With a view to preventing the aforesaid winding layer collapsing phenomenon, a glass roving package is proposed in Japanese Patent Laid-Open Publication No. 2001-88881. In this glass roving package, an outer surface of a glass fiber bundle package as a cylindrical package of a glass roving is coated with a bag-like heat-shrinkable film. The heat-shrinkable film is formed from a polypropylene resin composition or a polyethylene terephthalate resin composition. With this glass roving package, the occurrence of the foregoing collapse phenomenon is suppressed because a kinetic friction coefficient of the heat-shrinkable film is 0.1 to 0.7.

However, the aforesaid glass roving package has not always been considered satisfactory in point of surely preventing the above collapsing phenomenon.

Accordingly, it is an object of the second invention to provide an apparatus for manufacturing a continuous fiber-reinforced thermoplastic resin pellet which, even when a reinforcing fiber bundle is drawn out up to near the outermost winding layer of a roving package, can suppress collapse of the winding layer and draw out the reinforcing fiber bundle smoothly to the last without entanglement of the reinforcing fiber bundle in the winding layer, thereby making it possible to effect switching to a new fiber bundle package spliced to the drawn-out reinforcing fiber bundle while suppressing breakage of the reinforcing fiber bundle caused by the entanglement.

According to the continuous fiber-reinforced thermoplastic resin pellet manufacturing apparatus related to the second invention, even when the reinforcing fiber bundle is drawn out to near the outermost winding layer of the roving package, it is possible to prevent collapse of the winding layer and thereby suppress entanglement of the reinforcing fiber bundle in the winding layer. Consequently, it is possible to make switching to the new roving package spliced to the drawn-out reinforcing fiber bundle while suppressing the occurrence of breaking of the reinforcing fiber bundle caused by the aforesaid entanglement and hence possible to carry out the manufacture of the continuous fiber-reinforced thermoplastic resin pellet continuously over a long time.

Preferably, in the continuous fiber-reinforced thermoplastic resin pellet manufacturing apparatus, the pushing means is provided with a support pillar disposed inside the roving package and on the axis of the roving package and links each pinned to the support pillar pivotably about an axis orthogonal to the axis of the roving package, further, the collapse suppressing members are provided with collapse suppressing rods capable of coming into abutment against the inner side face of the roving package throughout the overall length in the axial direction, and a link mechanism for moving each of the collapse suppressing rods in parallel with the support pillar is constructed by the pushing means and the collapse suppressing members.

By so doing, the collapse suppressing rods can be brought into abutment against the inner side face of the roving package while maintaining the attitude of the collapse suppressing rods in parallel with the axis of the roving package by means of the link mechanism composed of both pushing means and collapse suppressing member. Thus, collapse of winding layers can be suppressed effectively by the collapse suppressing rods.

The third invention provides an apparatus for manufacturing a continuous fiber-reinforced thermoplastic resin pellet, comprising a plurality of roving packages each constituted by a cylindrical package of a reinforcing fiber bundle, a reinforcing fiber bundle delivery device configured to deliver the reinforcing fiber bundle in a successive manner from each of the roving packages without causing rotation of each of the roving packages, a terminal end of the reinforcing fiber bundle in one roving package and a front end of the reinforcing fiber bundle in another roving package which reinforcing fiber bundle is to be next taken out being connected with each other in series, an impregnation die for impregnating the reinforcing fiber bundle with molten thermoplastic resin to produce a resin-impregnated reinforcing fiber bundle, the reinforcing fiber bundle being introduced into the impregnation the after being drawn out continuously from the roving packages by the reinforcing fiber bundle delivery device, a withdrawing device disposed on a downstream side of the impregnation die to withdraw a continuous fiber-reinforced resin strand of the resin-impregnated reinforcing fiber bundle continuously from the impregnation die, and a cutter member for cutting the continuous fiber-reinforced resin strand, wherein the reinforcing fiber bundle delivery device includes a core guide for holding each of the roving packages in a stand-up attitude with the axis of each roving packages facing in a vertical direction and a reinforcing fiber bundle take-out guide disposed above the roving packages and adapted to support an intermediate portion of the reinforcing fiber bundle being conducted from the roving package to the impregnation die, and wherein if in a plan view a point of intersection between an extension line of a straight line, the straight line connecting the reinforcing fiber bundle take-out guide and an axial point of the roving package, and an outer circumference of the roving package is assumed to be a remotest point, then in a front view as seen in a direction orthogonal to a vertical plane including the axial point and the remotest point, each of the roving packages and the reinforcing fiber bundle take-out guide are disposed in such a manner that a take-out angle between a reinforcing fiber bundle pass line extending from the remotest point to the reinforcing fiber take-out guide and an axis of the roving package concerned is always not larger than 45° irrespective of the diameter of the outer circumference of the roving package.

The "continuous fiber-reinforced thermoplastic resin pellet" to be manufactured by the manufacturing apparatus of the third invention includes both a twisted such pellet and an untwisted such pellet.

According to this third invention it is possible to solve the following conventional problem.

The continuous fiber-reinforced thermoplastic resin pellet (hereinafter referred also simply as "continuous fiber-reinforced resin pellet") is used as a raw material for injection molding. The continuous fiber-reinforced resin pellet is superior in mechanical strength to a short fiber-reinforced resin pellet because its pellet length (for example, 3~10 mm or so) corresponds as it is to the fiber length.

For manufacturing the continuous fiber-reinforced resin pellet there is used a roving package in the shape of a coreless cylinder constituted by a winding of a reinforcing fiber bundle (roving). The reinforcing fiber bundle is in the shape of a flat string formed by joining a predetermined number of strands without twisting, the strands each being a bundle of a large number of filaments.

The continuous fiber-reinforced resin pellet is manufactured by a pultruding method. Both pultruding method not involving twisting and pultruding method involving twisting are known. In the pellet manufacturing method using the pultruding method not involving twisting, first the reinforcing fiber bundle is drawn out continuously from each roving package and is introduced into an impregnation die. In the impregnation die, the reinforcing fiber bundle is impregnated with molten thermoplastic resin. A continuous fiber-reinforced resin strand constituted by the resin-impregnated reinforcing fiber bundle is withdrawn continuously from the impregnation the by a withdrawing device disposed on a downstream side of the impregnation die. Then, the continuous fiber-reinforced resin strand is cut into a predetermined length by a pelletizer or the like to produce a continuous fiber-reinforced resin pellet. FIG. 21 is a schematic diagram showing the continuous fiber-reinforced resin pellet obtained by the pultruding method not involving twisting.

In the pellet manufacturing method using the pultruding method involving twisting, first the reinforcing fiber bundle is drawn out continuously from each of the roving packages and is introduced into an impregnation die. In the impregnation die, the reinforcing fiber bundle is impregnated with molten thermoplastic resin. With a withdrawing device disposed on a downstream side of the impregnation die, a continuous fiber-reinforced resin strand of a twisted, resin-impregnated reinforcing fiber bundle is withdrawn continuously from the impregnation die. Then, the continuous fiber-reinforced resin strand is cut into a predetermined length by a pelletizer or the like to afford a continuous fiber-reinforced resin pellet. In this case, as the withdrawing device there is used one which functions also as a twisting device such as twisting rollers. FIG. 20 is a schematic diagram showing a continuous fiber-reinforced resin pellet obtained by the pultruding method involving twisting.

In case of manufacturing a continuous fiber-reinforced resin pellet with use of a reinforcing fiber bundle taken out from a roving package, it is necessary to take a certain measure so that the reinforcing fiber bundle can be supplied continuously over a long time. Accordingly, end portions of reinforcing fiber bundles from plural roving packages are connected beforehand in a successive manner so as to give a single connection of the reinforcing fiber bundles and the reinforcing fiber bundle is taken out continuously in a successive manner from plural roving packages thus connected in series.

As methods for taking out (thawing out) the reinforcing fiber bundle from each roving package there are known (1) an outside withdrawing method, (2) an inside withdrawing method, and (3) a non-rotation type outside withdrawing method. The outside withdrawing method is a method of taking out (drawing out) the reinforcing fiber bundle from the outer periphery side of each roving package while rotating the roving package itself. The inside withdrawing method is a method of taking out (drawing out) the reinforcing fiber bundle from the inner periphery side of each roving package without causing rotation of the roving package itself, for example in a state in which the roving package is placed in a stand-up attitude on a certain thing. The non-rotation type outside withdrawing method is a method of taking out (drawing out) the reinforcing fiber bundle from the outer periphery side of each roving package without causing rotation of the roving package itself, for example in a state in which the roving package is placed in a stand-up attitude on a certain thing.

In manufacturing a continuous fiber-reinforced resin pellet with use of the reinforcing fiber bundle taken out successively from a plurality of interconnected roving packages, the above inside withdrawing method has heretofore been adopted widely (e.g., Japanese Patent Laid-Open Publication No. Hei 7 (1995)-205317). There are few examples adopting the above non-rotation type outside withdrawing method. Heretofore, no consideration has been given to the advantage that the adoption of the non-rotation type outside withdrawing method permits a simple configuration of the reinforcing fiber bundle delivery device for taking out the reinforcing fiber bundle from each roving package in comparison with the case adopting the inside withdrawing method.

Accordingly, it is an object of the third invention to provide an apparatus for manufacturing a continuous fiber-reinforced thermoplastic resin pellet which, when taking out a reinforcing fiber bundle continuously in a successive manner from a plurality of roving packages connected in series, by adopting the non-rotation type outside withdrawing method, to afford a continuous fiber-reinforced thermoplastic resin pellet, can take out the reinforcing fiber bundle smoothly from an outer periphery side of each roving package while suppressing engagement of the reinforcing fiber bundle with an outer periphery edge portion on an upper end side of each roving package and which, even when the reinforcing fiber bundle has been taken out up to near the innermost winding layer in the roving package being exhausted, can suppress entanglement of the reinforcing fiber package and can positively carry out switching to the next roving package connected to the roving package being exhausted.

According to the third invention, the reinforcing fiber bundle take-out angle is set always at 45° or less irrespective of the diameter of the outer circumference of each roving package, so when taking out the reinforcing fiber bundle from the outer periphery side of the roving package by the non-rotation type outside withdrawing method, there is no fear of the reinforcing fiber bundle being caught on the outer periphery edge portion on the upper end side of the roving package and it is possible to take out the reinforcing fiber bundle smoothly from the outer periphery side of the roving package.

In the manufacturing apparatus of the third invention, the reinforcing fiber bundle is drawn out from each roving package while holding the roving package in a stand-up attitude, so even when the reinforcing fiber bundle has been taken out up to near the innermost winding layer of the roving package and the winding layer becomes thin, it is possible to prevent entanglement of the reinforcing fiber bundle in the winding layer. Consequently, it is possible to positively effect switching to the next roving package connected to the roving package being exhausted.

Thus, according to the manufacturing apparatus of the third invention the reinforcing fiber bundle can be fed to the impregnation the continuously over a long time while suppressing breaking of the reinforcing fiber bundle and suppressing failure in switching from one to another roving package, so that the productivity of the continuous fiber-reinforced thermoplastic resin pellet can be improved.

In the above continuous fiber-reinforced thermoplastic resin pellet manufacturing apparatus it is preferable that the core guide be configured so as to be able to hold two such roving packages as described above.

By so doing it is possible to adopt a method wherein after the reinforcing fiber bundle has been exhausted on one of two roving packages held by the core guide, the one roving package is replaced with a new roving package, and a terminal end of the other roving package and a front end of the new roving package are connected together. Consequently, the reinforcing fiber bundle can be taken out alternately from two roving packages while repeating connection of the reinforcing fiber bundles of the two roving packages.

INDUSTRIAL APPLICABILITY

According to the present invention it is possible to smoothly carry out a continuous drawing-out work for the reinforcing fiber bundle (continuous fiber-reinforced resin strand).

The invention claimed is:

1. A method for manufacturing a continuous fiber-reinforced thermoplastic resin pellet, comprising the steps of:
    drawing out a reinforcing fiber bundle of a large number of reinforcing filaments continuously from a roving package;
    introducing the reinforcing fiber bundle thus drawn out from the roving package into an impregnation die continuously and impregnating the thus-introduced reinforcing fiber bundle with molten thermoplastic resin to produce a resin-impregnated reinforcing fiber bundle;
    twisting the resin-impregnated reinforcing fiber bundle that is passing continuously through the impregnation die by a twisting device disposed on a downstream side of the impregnation die to produce a continuous fiber-reinforced resin strand; and
    cutting the continuous fiber-reinforced resin strand to produce a pellet while withdrawing the continuous fiber-reinforced resin strand continuously,
    wherein said step of drawing out the reinforcing fiber bundle continuously from the roving package includes an operation of splicing the reinforcing fiber bundle fed from a roving package being exhausted and the reinforcing fiber bundle fed from a new roving package with each other, said reinforcing fiber bundle splicing operation being carried out in such a manner that, with respect to each of a terminal end portion of the reinforcing fiber bundle from the roving package being exhausted and a start end portion of the reinforcing fiber bundle from the new roving package, a part in a sectional direction orthogonal to the longitudinal direction of the reinforcing fiber bundle concerned is removed over a predetermined range in the longitudinal direction of the reinforcing fiber bundle to form a fiber quantity-halved end portion where the quantity of fibers in the section of the reinforcing fiber bundle is about half of the original fiber quantity, further, the reinforcing filaments in the fiber quantity-halved end portion of the roving package being exhausted and the reinforcing filaments in the fiber quantity-halved end portion of the new roving package are entangled with each other at one or more positions in their longitudinal direction by means of an air splicer, and in a fiber quantity unreduced end portion which is an upstream portion relative to the fiber quantity-halved end portion in the reinforcing fiber bundle of the new roving package and in which the part in the sectional direction remains unremoved, the reinforcing filaments are entangled with each other at one or more positions in their longitudinal direction by means of an air splicer.

2. The method for manufacturing the continuous fiber-reinforced thermoplastic resin pellet according to claim 1, wherein in said splicing operation an adhesive of the same resin as the thermoplastic resin impregnated into the reinforcing fiber bundle is applied to the entangled portion of the reinforcing filaments entangled by the air splicer.

3. The method for manufacturing the continuous fiber-reinforced thermoplastic resin pellet according to claim 1, wherein said step of drawing out the reinforcing fiber bundle continuously from the roving package includes an operation of drawing out the reinforcing fiber bundle in a successive manner from an inner periphery side of the roving package, and in said withdrawing operation a plurality of collapse suppressing members pushed radially outwards against an inner periphery surface of the roving package are allowed to shift following the inner periphery surface of the roving package which inner periphery surface shifts radially outwards gradually as the reinforcing fiber bundle is drawn out, to suppress collapse of the reinforcing fiber bundle of the roving package.

4. The method for manufacturing the continuous fiber-reinforced thermoplastic resin pellet according to claim 1, wherein said step of drawing out the reinforcing fiber bundle continuously from the roving package includes an operation of taking out the reinforcing fiber bundle from an outer periphery side of each of the spliced roving packages through a reinforcing fiber bundle take-out guide disposed above the roving packages without causing rotation of the roving packages and while holding each of the roving packages in a stand-up attitude with axes of the roving packages facing in a vertical direction, and in connection with said taking-out operation, the reinforcing fiber bundle is taken out in such a manner that if in a plan view a point of intersection between an extension line of a straight line, the straight line connecting the reinforcing fiber bundle take-out guide and an axial point of the roving package, and an outer circumference of the roving package is assumed to be a remotest point, a take-out angle between a reinforcing fiber bundle pass line extending from the remotest point to the reinforcing fiber bundle take-out guide and an axis of the roving package concerned is always 45° or less irrespective of the diameter of the outer circumference of the roving package, in a front view as seen in a direction orthogonal to a vertical plane including the axial point and the remotest point.

5. The method for manufacturing the continuous fiber-reinforced thermoplastic resin pellet according to claim 1, wherein in said step of drawing out the reinforcing fiber bundle continuously from the roving package, two of the roving packages are disposed at all times and are connected with each other, further, after the reinforcing fiber bundle of one of the two roving packages has been exhausted, the one roving package is replaced with a new roving package, and a terminal end of the other roving package and a front end of the new roving package are connected with each other.

* * * * *